United States Patent
Wu

(10) Patent No.: US 12,413,775 B2
(45) Date of Patent: Sep. 9, 2025

(54) DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventor: Jiaping Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 147 days.

(21) Appl. No.: 18/144,054

(22) Filed: May 5, 2023

(65) Prior Publication Data

US 2024/0040147 A1 Feb. 1, 2024

Related U.S. Application Data

(63) Continuation of application No. PCT/CN2022/109380, filed on Aug. 1, 2022.

(30) Foreign Application Priority Data

Aug. 24, 2021 (CN) .......................... 202110974007.3

(51) Int. Cl.
*H04N 19/59* (2014.01)
*G06T 3/4053* (2024.01)
(Continued)

(52) U.S. Cl.
CPC ........... *H04N 19/59* (2014.11); *G06T 3/4053* (2013.01); *H04N 19/132* (2014.11); *H04N 19/172* (2014.11)

(58) Field of Classification Search
CPC .... H04N 19/59; H04N 19/132; H04N 19/172; H04N 21/2402; H04N 21/2662;
(Continued)

(56) References Cited

U.S. PATENT DOCUMENTS

2014/0036033 A1* 2/2014 Takahashi ............ H04N 19/597
348/43
2014/0344882 A1* 11/2014 Shahmoon ......... H04N 21/2662
725/116
(Continued)

FOREIGN PATENT DOCUMENTS

CN 1984327 A 6/2007
CN 103796013 A 5/2014
(Continued)

OTHER PUBLICATIONS

Tencent Technology, ISR, PCT/CN2022/109380, Nov. 14, 2022, 2 pgs.
(Continued)

Primary Examiner — Hesham K Abouzahra
(74) Attorney, Agent, or Firm — Morgan, Lewis & Bockius LLP

(57) ABSTRACT

This application discloses a data processing method performed by a computer device. The method includes: detecting a data volume of a first picture frame after being coded; in response to the data volume of the first picture frame being greater than or equal to a data volume threshold, performing downsampling on the first picture frame to obtain a first adjusted picture frame; coding the first adjusted picture frame to obtain a picture frame code stream of the first adjusted picture frame; and transmitting the picture frame code stream to an application client at a terminal for decoding the picture frame code stream to obtain a first adjusted picture frame, which is then upsampled to the same resolution as the first picture frame and displayed accordingly.

17 Claims, 12 Drawing Sheets

(51) Int. Cl.
*H04N 19/132* (2014.01)
*H04N 19/172* (2014.01)

(58) Field of Classification Search
CPC .... H04N 21/234363; H04N 21/440263; G06T 3/4053; A63F 13/355
See application file for complete search history.

(56) References Cited

U.S. PATENT DOCUMENTS

| | | |
|---|---|---|
| 2015/0278655 A1 | 10/2015 | Kurose |
| 2019/0373293 A1 | 12/2019 | Bortman et al. |
| 2020/0213605 A1 | 7/2020 | Wenger et al. |
| 2020/0396460 A1* | 12/2020 | Gao ............... H04N 19/159 |

FOREIGN PATENT DOCUMENTS

| | | |
|---|---|---|
| CN | 105306773 A | 2/2016 |
| CN | 105959705 A | 9/2016 |
| CN | 110149555 A | 8/2019 |
| CN | 110740350 A | 1/2020 |
| CN | 111135569 A | 5/2020 |
| CN | 111681167 A | 9/2020 |
| CN | 111681291 A | 9/2020 |
| CN | 112468855 A | 3/2021 |
| CN | 112601068 A | 4/2021 |
| CN | 112839184 A | 5/2021 |
| CN | 113422983 A | 9/2021 |
| JP | 2001177826 A | 6/2001 |
| JP | 2005303710 A | 10/2005 |
| JP | 2013030898 A | 2/2013 |
| WO | WO 2013155880 A1 | 10/2013 |
| WO | WO 2020177015 A1 | 9/2020 |

OTHER PUBLICATIONS

Tencent Technology, WO, PCT/CN2022/109380, Nov. 14, 2022, 5 pgs.
Tencent Technology, IPRP, PCT/CN2022/109380, Feb. 27, 2024, 6 pgs.
Tencent Technology, Extended European Search Report, EP Patent Application No. 22860178.7, Jun. 27, 2024, 8 pgs.
Tencent Technology, Japanese Office Action, JP Patent Application No. 2023-569620, Dec. 12, 2024, 17 pgs.

* cited by examiner

DATA PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/109380, entitled "DATA PROCESSING METHOD, COMPUTER DEVICE, AND STORAGE MEDIUM" filed on Aug. 1, 2022, which claims priority to Chinese Patent Application No. 202110974007.3, entitled "DATA PROCESSING METHOD, COMPUTER DEVICE, AND STORAGE MEDIUM" filed to the China National Intellectual Property Administration on Aug. 24, 2021, all of which is incorporated herein by reference in its entirety.

FIELD OF THE TECHNOLOGY

This application relates to the technical field of data processing, and in particular, to a data processing method and apparatus, a computer device, a storage medium, and a computer program product.

BACKGROUND OF THE DISCLOSURE

Picture frames displayed in an application client are generally coded by an application server of the application client. When scenes are switched in the application client (for example, switching from one application scene to another application scene), a data volume of a scene-switched picture frame obtained by the application server is generally large. If the application server directly transmits a code stream of the picture frame to the application client at this moment, the code stream transmission speed will be low, thus causing non-fluent display of the picture frame at the application client. Therefore, how to improve the code stream transmission speed and thus improve the fluency when the application client displays the picture frame becomes a hot problem.

SUMMARY

This application provides a data processing method and apparatus, a computer device, a storage medium, and a computer program product.

An aspect of this application provides a data processing method performed by a computer device as an application server. The method includes:
  detecting a data volume of a first picture frame after being coded;
  in response to the data volume of the first picture frame being greater than or equal to a data volume threshold, performing downsampling on the first picture frame to obtain a first adjusted picture frame;
  coding the first adjusted picture frame to obtain a picture frame code stream of the first adjusted picture frame; and
  transmitting the picture frame code stream to an application client at a terminal, wherein the application client decodes the picture frame code stream to obtain a first adjusted picture frame, upsamples the first adjusted picture frame to obtain a second picture frame having a same resolution as the first picture frame, and displays the second picture frame.

An aspect of this application provides a data processing method. The method may be applied to an application client at a terminal. The method includes:
  obtaining a picture frame code stream transmitted by an application server, the picture frame code stream being obtained by coding a first adjusted picture frame, the first adjusted picture frame being obtained after performing downsampling on a first picture frame of the application client, a data volume of the first picture frame being greater than or equal to a data volume threshold, a resolution of the first picture frame being a first resolution, a resolution of the first adjusted picture frame being a second resolution, and the second resolution being less than the first resolution;
  decoding the picture frame code stream to obtain the first adjusted picture frame;
  adjusting the resolution of the first adjusted picture frame back to the first resolution to obtain a second picture frame, and displaying the second picture frame.

An aspect of this application provides a computer device, including a memory and one or more processors. The memory stores computer-readable instructions. The computer-readable instructions, when executed by the one or more processors, cause the computer device to perform the data processing method in any of the foregoing aspects.

An aspect of this application provides a non-transitory computer-readable storage medium. The computer-readable storage medium stores a computer program. The computer program includes program instructions. The program instructions, when executed by a processor of a computer device, cause the computer device to perform the data processing method in any of the foregoing aspects.

According to an aspect of this application, a computer program product or computer program is provided. The computer program product or computer program includes computer-readable instructions. The computer-readable instructions are stored in a non-transitory computer-readable storage medium. One or more processors of a computer device read the computer-readable instructions from the computer-readable storage medium. The one or more processors execute the computer-readable instructions to enable the computer-readable device to perform the data processing method in any of the foregoing aspects.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

In order to more clearly illustrate the technical solutions of this application or the related art, the drawings required to describe the embodiments or the related art will be briefly introduced below. It is apparent that the drawings described below are merely some embodiments of this application, and a person of ordinary skill in the art may obtain other drawings according to these drawings without involving any inventive effort.

DESCRIPTION OF EMBODIMENTS

The technical solutions in this application are clearly and completely described below with reference to the accompanying drawings in this application. Apparently, the described embodiments are merely some rather than all of embodiments of this application. Based on the embodiments in this application, all the other embodiments obtained by a person of ordinary skill in the art without involving any inventive effort fall within the scope of protection of this application.

Figure 1:
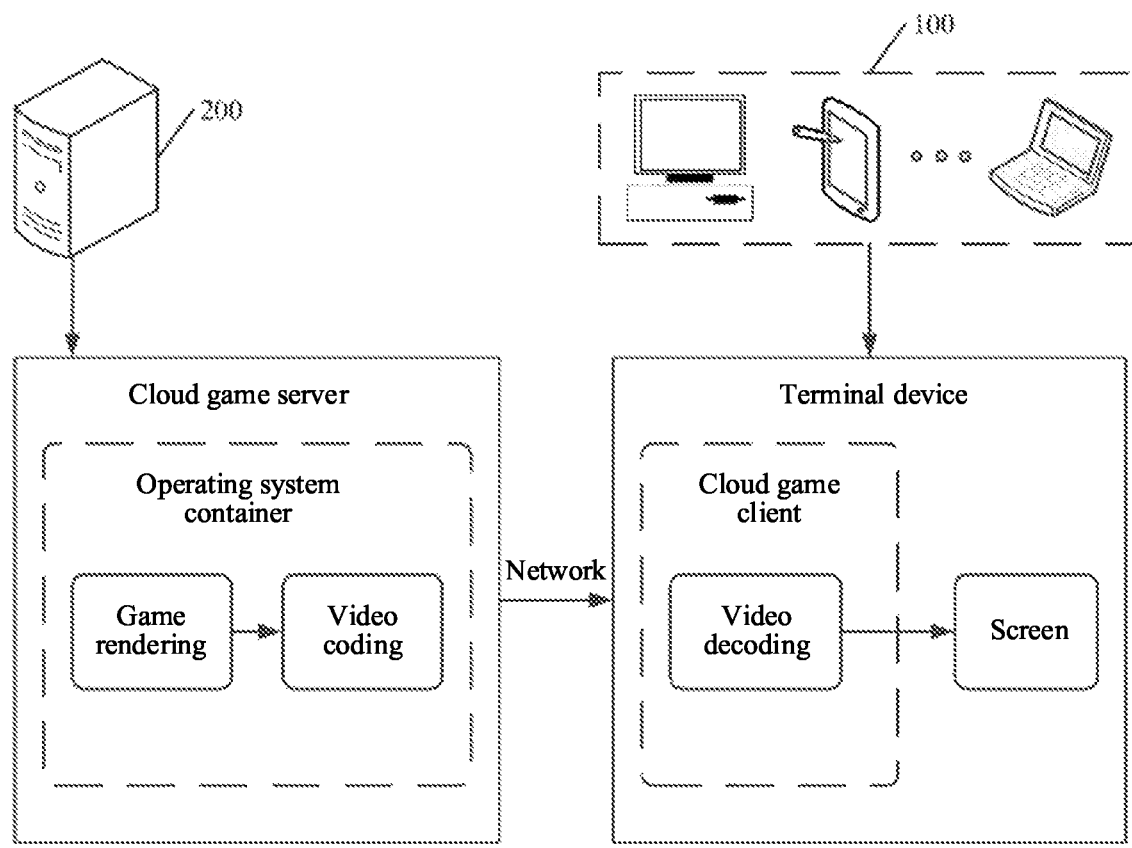
FIG. 1 is a schematic structural diagram of a network architecture according to an embodiment of this application.

Reference is made to FIG. 1. FIG. 1 is a schematic structural diagram of a network architecture according to an embodiment of this application. As shown in FIG. 1, the network architecture may include a server 200 and a terminal device cluster 100. The terminal device cluster 100 may include one or more terminal devices. The number of the terminal devices will not be limited herein. As shown in FIG. 1, each terminal device in the terminal device cluster 100 may be networked to the server 200, so that each terminal device may perform data exchange with the server 200 through the network connection.

The server 200 shown in FIG. 1 may be an independent physical server, may alternatively be a server cluster or distributed system composed of a plurality of physical servers, and may alternatively be a cloud server providing basic cloud computing services, such as a cloud service, a cloud database, cloud computing, a cloud function, cloud storage, a network service, cloud communication, a middleware service, a domain name service, a security service, a CDN, and a big data and artificial intelligence platform. The terminal device may be: a desktop computer, a notebook computer, a smartphone, a tablet computer, an Internet of Things device, and a portable wearable device. The Internet of Things device may be a smart speaker, a smart television, a smart air conditioner, a smart vehicle-mounted device, or the like. The portable wearable device may be a smart watch, a smart bracelet, a head-mounted device, or the like.

The server 200 may be a back-end server of a cloud game client, and therefore the server 200 may alternatively be referred to as a cloud game server. The terminal device (which may be any terminal device in a terminal device cluster) may include the cloud game client. After rendering a game in an operating system container to obtain a game picture frame, the server 200 may perform video coding on the game picture frame to obtain a code stream (binary code) of the game picture frame. Further, the server 200 may transmit the code stream obtained by coding to the terminal device through a network, and the terminal device may decode the code stream to obtain the game picture frame through the cloud game client, and may display, on a screen, the game picture frame obtained by decoding. The game picture frame is each picture frame in a game video, and the operation of coding and decoding the game picture frame is coding and decoding the game video.

Figure 2:
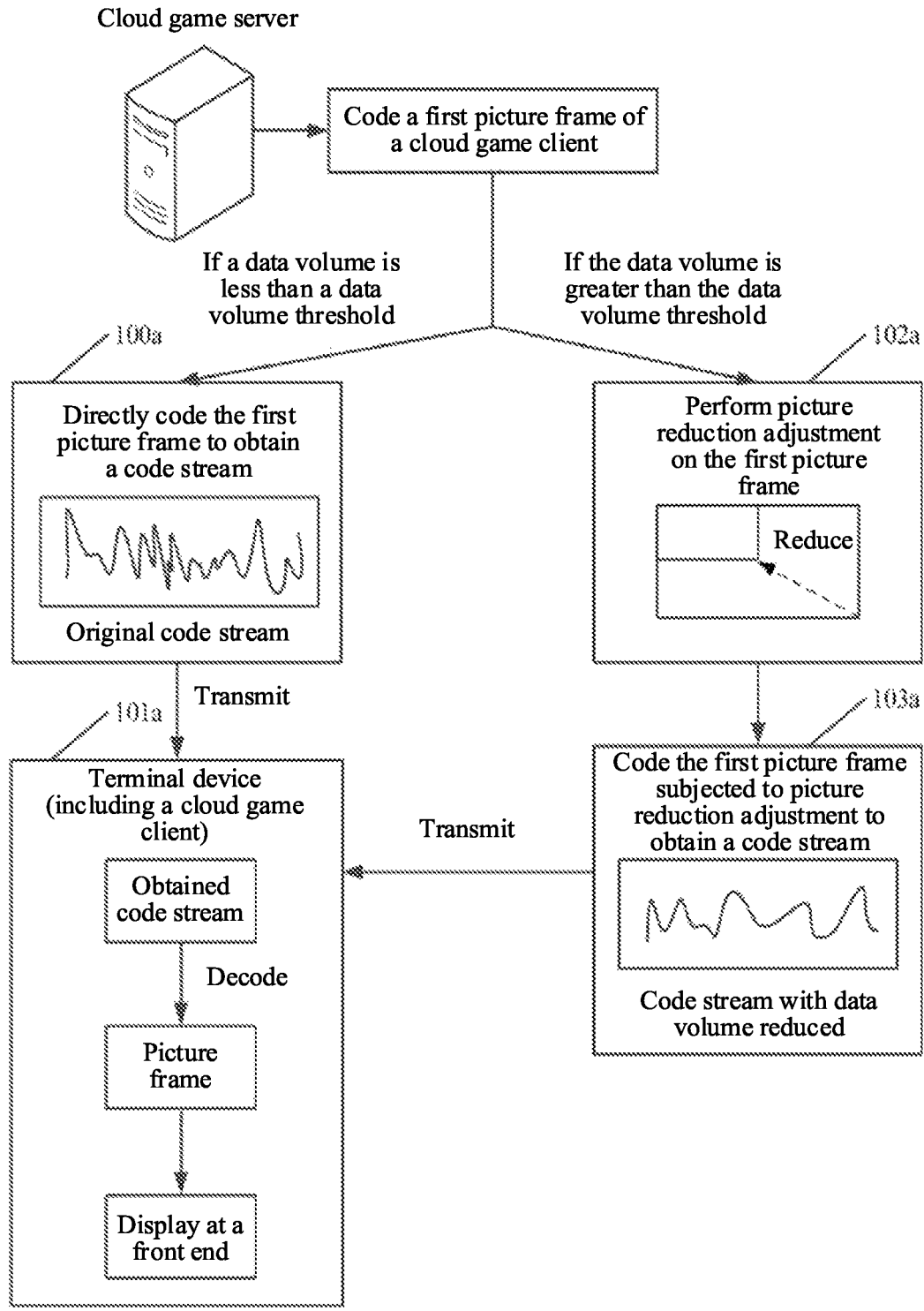
FIG. 2 is a schematic scene diagram of picture frame coding according to this application.

Reference is made to FIG. 2 together. FIG. 2 is a schematic scene diagram of picture frame coding according to this application. As shown in FIG. 2, a cloud game server (for example, the server 200) may detect, when a first picture frame of a cloud game client is obtained by coding, a data volume of the first picture frame. The first picture frame may be any frame of picture in the cloud game client. In other words, the cloud game server may detect, every time a picture frame of the cloud game client is obtained by coding, a data volume of the picture frame obtained by coding.

If the cloud game server detects that the data volume of the first picture frame is less than a data volume threshold (which may be set according to an actual application scene), the cloud game server may directly code the first picture frame to obtain an original code stream of the first picture frame (for example, block 100*a*). The cloud game server may transmit the original code stream of the first picture frame to a terminal device (which may be any terminal device in the terminal device cluster 100), and then the terminal device may decode the code stream to obtain the first picture frame and display the first picture frame at a front end (for example, block 101*a*).

However, if the cloud game server detects that the data volume of the first picture frame is greater than or equal to the data volume threshold and the first picture frame is generally a scene-switched picture frame, the cloud game server may perform downsampling on the first picture frame (for example, block 102*a*). The operation of performing downsampling on the picture frame may refer to reducing the resolution of the picture frame, and then the cloud game server may code the first picture frame subjected to downsampling to obtain a corresponding code stream (for example, block 103*a*). The data volume of the code stream is less than the data volume of the code stream obtained by directly coding the first picture frame. The cloud game server may transmit the code stream obtained by coding the first picture frame subjected to downsampling to the terminal device, so that the terminal device may also decode the obtained code stream and obtain the first picture frame subjected to downsampling, and the terminal device may also perform super-resolution adjustment on the first picture frame subjected to downsampling to obtain a picture frame with the same resolution as the first picture frame and display the picture frame at the front end. Since the resolution of the picture frame is the same as the resolution of the first picture frame, the picture quality of the picture frame displayed at this moment does not change significantly compared to the first picture frame.

With the method provided in this application, since the data volume of a scene-switched picture frame is generally relatively large, the scene-switched picture frame with the relatively large data volume may be subjected to downsampling and then coded. At this moment, the data volume of a code stream obtained by coding may be much less than the data volume of a code stream obtained by coding an original picture frame. Therefore, when a cloud game server transmits the code stream obtained by coding at this moment to a cloud game client, the speed thereof will also be higher, so that the cloud game client may display a corresponding picture frame (for example, a picture frame after super-resolution adjustment is performed on the first picture frame subjected to downsampling) at a higher speed, and a user does not feel the display non-fluency of the picture frame.

Figure 3:
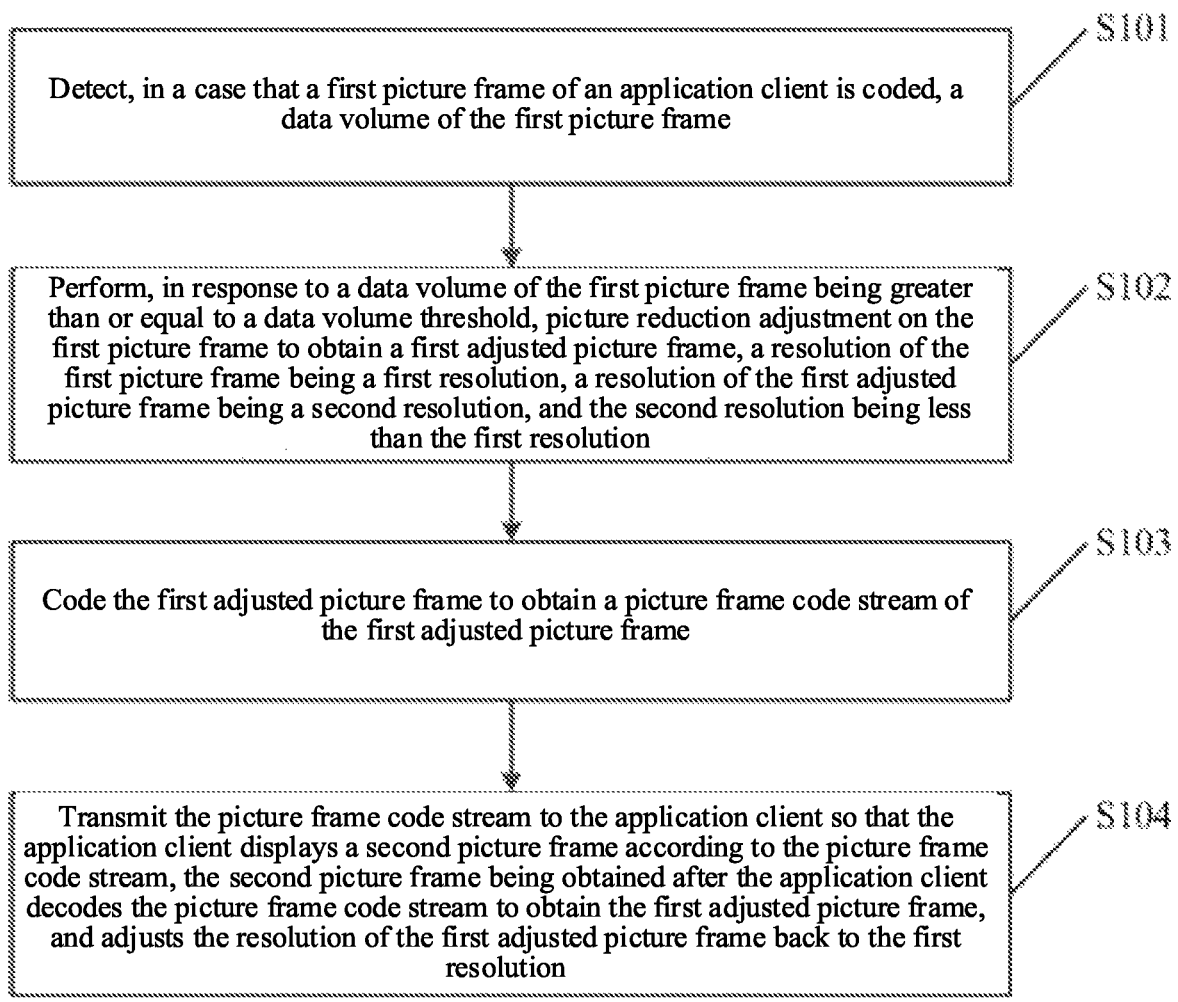
FIG. 3 is a schematic flowchart of a data processing method according to this application.

Reference is made to FIG. 3. FIG. 3 is a schematic flowchart of a data processing method according to this application. As shown in FIG. 3, the method may include the following steps:

Step S101: Detect, when a first picture frame of an application client is obtained by coding, a data volume of the first picture frame.

In some embodiments, the executive subject in this embodiment of this application may be an application server (for example, the server 200, which may be the cloud game server). The application server may be a back-end server of an application client. The application client may be any client which may display a picture frame. The application client may exist in a terminal device (for example, a terminal device in the terminal device cluster 100, where the application client may be the cloud game client). The application client may be an application (app) installed in the terminal device, or the application client may be a web client in the terminal device. This is not limited. It is to be understood that in the following description, operations performed by the application client may be performed by the terminal device where the application client is located. The number of the application servers may be one or plural. If there are a plurality of application servers, the plurality of application servers may constitute a distributed data processing system to perform the method according to this embodiment of this application in a distributed manner.

Each picture frame displayed in the application client may be coded by the application server. The first picture frame may be any picture frame coded by the application server. When the first picture frame is coded by the application server, the application server may detect the data volume (in bytes) of the first picture frame. In other words, every time a picture frame of the application client is coded by the application server, the application server may detect the data volume of the coded picture frame. A picture frame may be an image frame.

It is to be understood that each picture frame displayed in the application client may be displayed according to a user operation of a user. For example, the user clicks/taps a button in the application client to display a corresponding picture frame by switching. Alternatively, the application client may be a cloud game client (also referred to as a game client), and the user is supported to play a cloud game in the cloud game client. Therefore, each picture frame in the application client may also be a game picture displayed by the user according to relevant game operations of the user during the process of playing the cloud game. The first picture frame may be a game picture frame in the cloud game client. The application server may obtain the user operation of the user in the application client, code a picture frame requested to be displayed by the user operation, and provide the coded picture frame to the application client in the form of a code stream. The application client may obtain a corresponding picture frame for displaying after decoding the obtained code stream.

Step S102: Perform, in response to the data volume of the first picture frame being greater than or equal to a data volume threshold, downsampling on the first picture frame to obtain a first adjusted picture frame, a resolution of the first picture frame being a first resolution, a resolution of the first adjusted picture frame being a second resolution, and the second resolution being less than the first resolution.

In some embodiments, if the application server detects that the data volume of the first picture frame is greater than or equal to the data volume threshold, the application server may perform downsampling on the first picture frame. It is to be understood that the data volume of some coded scene-switched picture frames of the application client is generally greater than or equal to the data volume threshold. Therefore, by performing downsampling on the picture frame having the data volume greater than or equal to the data volume threshold, the data volume of a code stream corresponding to the subsequently obtained picture frame is less, so that the application server may transmit the code stream corresponding to the picture frame to the application client at a higher transmission speed, and the application client may display a picture frame during scene switching with a smaller delay (specifically embodied in fluent display). The picture frame may be a first picture frame, and the operation of displaying the picture frame may refer to displaying a second picture frame corresponding to the first picture frame. The second picture frame has the same picture content as the first picture frame. However, the second picture frame is obtained by decoding a code stream corresponding to the first picture frame after reducing the data volume. For further details, reference may be made to the relevant content described in the following step S103.

In some embodiments, the application client may be a game client, and the application server may perform downsampling on the first picture frame when it is detected that the data volume of the first picture frame is greater than or equal to the data volume threshold and the first picture frame is a picture frame during scene switching in the game client.

When switching from picture frame a of the application client to picture frame b of the application client, if the picture content in picture frame a is greatly different from the picture content in picture frame b (for example, picture frame a belongs to a game battle picture in a game, and picture frame b belongs to a game settlement picture after the game ends), picture frame b may be considered to be a scene-switched picture frame of the application client. In other words, the scene-switched picture frame may refer to that a content type (or a content scene) to which the picture content of the picture frame belongs changes compared to a picture frame preceding the picture frame. For another example, the operation of performing scene switching in the game client may refer to switching from a scene where a game is logged in by the game client to a scene after the game is logged in by the game client. At this moment, a picture frame after the switching greatly differs from a picture frame before the switching, and the picture frame after the switching may be the first picture frame. When the scene is switched, the data volume of the scene-switched first picture frame is generally large (for example, greater than a data volume threshold).

Figure 4:
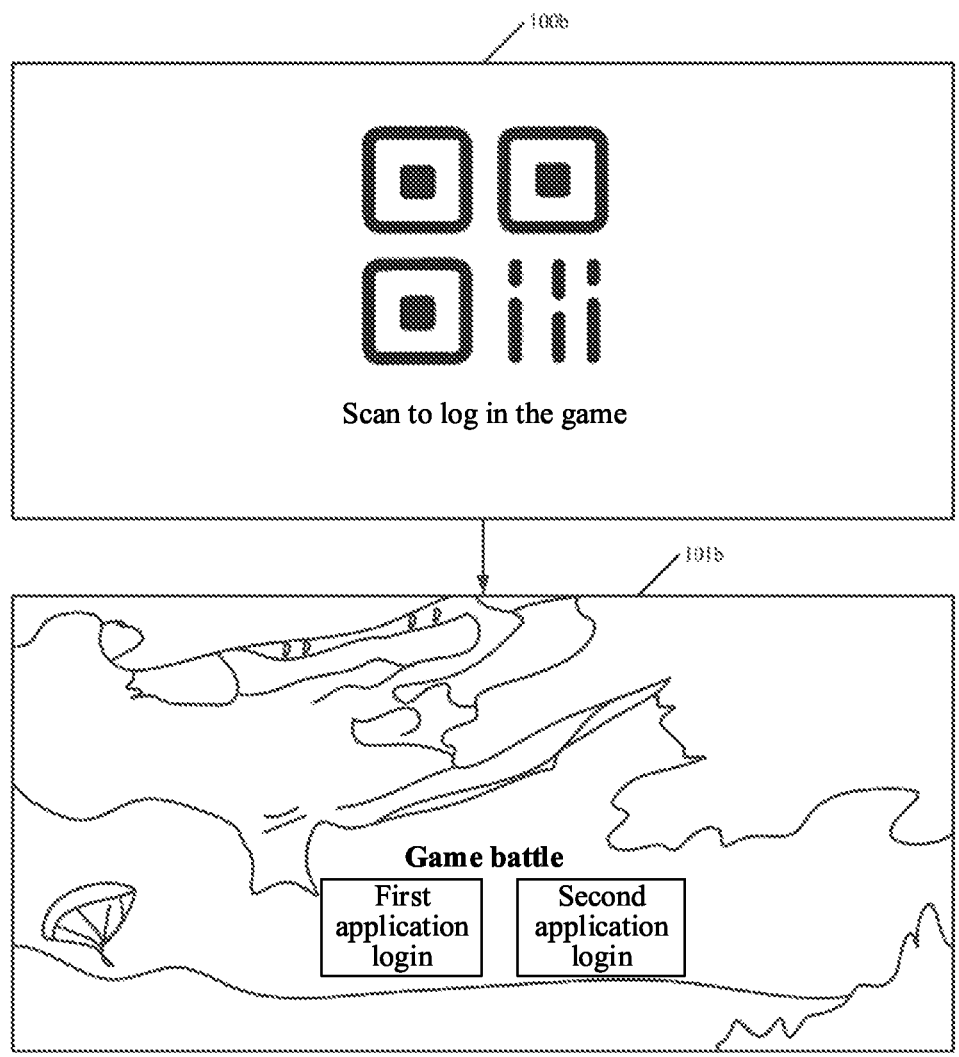
FIG. 4 is a schematic picture diagram of scene switching according to this application.

Reference is made to FIG. 4. FIG. 4 is a schematic picture diagram of scene switching according to this application. Picture frame 100b is a picture frame of a code-scanning login interface, picture frame 101b is a picture frame of a game login interface, and when jumping to display from picture frame 100b to picture frame 101b, picture frame 101b belongs to a picture frame during scene switching.

In this way, the application client is a game client. Picture reduction adjustment is performed on the first picture frame to obtain the first adjusted picture frame in response to the first picture frame belonging to a game picture frame of the game client during scene switching and the data volume of the first picture frame being greater than or equal to the data volume threshold. When the scene is switched at the game client, if the data volume of the first picture frame is too large, downsampling may be performed on the first picture frame to obtain the first adjusted picture frame to be coded, so as to obtain a picture frame code stream of the first adjusted picture frame. The data volume of the picture frame code stream is greatly reduced compared with a code stream obtained by directly coding the first picture frame. Therefore, the application server may transmit the picture frame code stream to the game client at a higher speed, so that the game client may display a second picture frame used for replacing the first picture frame at a higher speed, the picture frame can be displayed more fluently and quickly, and a user does not feel the display non-fluency of the picture frame.

The data volume threshold may be set according to practical application scenes. This is not limited. A method for obtaining a data volume threshold is provided herein, specifically as follows:

The application server may obtain a unit transmission data volume and a unit transmission frame number for the application client. The unit transmission data volume may be in bits, the unit transmission data volume indicates the number of bits transmitted per second for the application client, and the unit transmission data volume may be represented as Mbps. The unit transmission frame number may be in bits, the unit transmission frame number indicates the number of frames transmitted per second for the application client, and the unit transmission frame number may be represented as fps.

Therefore, the application server may obtain an average frame data volume through the unit transmission data volume and the unit transmission frame number. The average frame data volume may indicate the data volume of a general transmitted picture frame. For example, the average frame data volume may be obtained by dividing the unit transmission data volume by the unit transmission frame number. While a general user will not have a noticeable sense of jitter for one or two frames, if more than three frames are exceeded, the user will have a visually greater sense of non-fluency, and therefore the data volume threshold may be set to three times the average frame data volume.

For example, the unit transmission data volume may generally be equal to 3 Mbps, the unit transmission frame number may generally be equal to 30 fps, and therefore the average frame data volume may generally be equal to 3 Mbps/30 fps=100 kbits (namely, 100k bits)=12.5 kbytes (namely, 12.5k bytes). 3M represents 3000k, and k represents thousand (namely, 1000). Therefore, the data volume threshold may be equal to 12.5 kbytes*3=37.5 kbytes (namely, 37.5k bytes).

In this way, the unit transmission data volume and the unit transmission frame number for the picture frame of the application client are obtained, the average frame data volume is determined according to the unit transmission data volume and the unit transmission frame number, and the data volume threshold is determined according to the average frame data volume. It is to be understood that different application clients have corresponding unit transmission data volumes and unit transmission frame numbers, and accordingly, different application clients have corresponding average frame data volumes. Thus, different application clients have corresponding data volume thresholds. In this way, according to the data volume threshold adapted to different application clients, picture frames that need to perform downsampling for each of the different application clients are determined, and differentiated picture frame coding may be realized between the different application clients, so as to realize the picture frame coding adapted to the application clients, thereby further improving the fluency and speed of picture display at the application clients, and making the user not feel the display non-fluency of the picture frame.

Therefore, if the data volume of the first picture frame is greater than or equal to the data volume threshold, the application server may perform downsampling on the first picture frame, the first picture frame subjected to downsampling may be referred to as the first adjusted picture frame, and performing downsampling on the picture frame may refer to reducing the resolution of the picture frame. For example, the resolution of the first picture frame may be denoted as a first resolution, the resolution of the first adjusted picture frame may be noted as a second resolution, and the second resolution is less than the first resolution. For example, the first resolution may be 1280*720, the second resolution may be 640*360, the first resolution is four times the second resolution, and the second resolution is ¼ of the first resolution. The specific process of performing downsampling on the first picture frame may be described with reference to the following description in the embodiment corresponding to FIG. 9.

If the data volume of the first picture frame is less than the data volume threshold, the first picture frame may not be subjected to downsampling.

Step S103: Code the first adjusted picture frame to obtain a picture frame code stream of the first adjusted picture frame.

In some embodiments, the application server may code the first adjusted picture frame to obtain a picture frame code stream (which may be simply referred to as a code stream) of the first adjusted picture frame. The code stream may be in bytes or bits. Therefore, the code stream may be referred to as a byte stream or a bit stream.

The operation of performing downsampling on the first picture frame generally is: performing reduction through a horizontal reduction ratio and a longitudinal reduction ratio for the first picture frame (specifically described with reference to the following description in the embodiment corresponding to FIG. 9). The picture frame code stream of the first adjusted picture frame may further include the horizontal reduction ratio and the longitudinal reduction ratio. Furthermore, the picture frame code stream may further include a reduction flag. The reduction flag is used for indicating that the first adjusted picture frame is obtained after performing downsampling. The reduction flag may not be included in the code stream of the picture frame on which downsampling is not performed. The horizontal reduction ratio, the longitudinal reduction ratio and the reduction flag included in the picture frame code stream of the first adjusted picture frame may all be referred to as supplemental enhancement information (SEI).

The specific process of coding, by the application server, the first adjusted picture frame may be as follows:

The application server may obtain a blank picture frame with the resolution being the first resolution (for example, 1280*720). The application server may copy the first adjusted picture frame into the blank picture frame, for example, may copy the first adjusted picture frame into the upper left corner of the blank picture frame. The blank picture frame copied with the first adjusted picture frame may be referred to as a first copied picture frame. Since the second resolution (for example, 640*360) of the first adjusted picture frame is less than the first resolution, after copying the first adjusted picture frame into the blank picture frame, the first copied picture frame also includes a partially blank area. Pixel values in the partially blank area may all equal to 0, while pixel values in a non-blank area in the first copied picture frame may be pixel values included in the first adjusted picture frame.

It is to be understood that the reason why the first copied picture frame is coded after the first copied picture frame is obtained by copying the first adjusted picture frame into the blank picture frame in this application to realize the coding of the first adjusted picture frame is as follows: The application server may code a picture frame by a coder so as to obtain a code stream of the picture frame. However, for a picture frame with a data volume less than a data volume threshold (hereinafter may be referred to as a conventional picture frame), it is not necessary to perform downsampling. Therefore, the conventional picture frame with the data volume less than the data volume threshold may be directly coded by the coder, so as to obtain a code stream corresponding to the conventional picture frame.

The picture frame (for example, the first picture frame) with the data volume greater than or equal to the data volume threshold needs to be subjected to downsampling. At this moment, the size (for example, the size of the second resolution) of the picture frame (for example, the first adjusted picture frame) obtained by downsampling does not comply with a coding specification of the coder (the coding specification may refer to a specification for coding a picture frame with the size of the first resolution). Therefore, the first copied picture frame obtained by copying the first adjusted picture frame into the blank picture frame may be understood as a picture frame with the size of the first adjusted picture frame adjusted back to an original size (namely, the size of the first resolution). At this moment, the size of the first copied picture frame is the same as the size of the conventional picture frame, and the size of the first copied picture frame complies with the coding specification of the coder. Therefore, the coder may directly code the first copied picture frame so as to realize the coding of the first adjusted picture frame. It can be seen that by copying the first adjusted picture frame to the blank picture frame and then performing coding, re-modification of the coder can be avoided, thereby avoiding the technical problem and resource consumption caused by the re-modification of the coder.

Further, the application server may code the first copied picture frame, and the picture frame code stream of the first adjusted picture frame may be obtained specifically as follows:

It is to be understood that the first copied picture frame may be obtained after performing downsampling on the first picture frame. The size of the first copied picture frame does not change (also the first resolution) compared to the first picture frame. However, the data volume of the first copied picture frame is greatly reduced compared to the first picture frame. For example, if the second resolution is ¼ of the first resolution, only ¼ of data in the first copied picture frame is valid data, and ¾ of the data is invalid data (for example, a pixel value equal to 0). In other words, the data volume of the first copied picture frame is ¼ of the data volume of the first picture frame.

After obtaining the first copied picture frame, the application server may also obtain a picture frame preceding the first picture frame of the application client. The preceding picture frame is coded by the application server. The application server only needs to obtain the preceding picture frame from the background rather than from the application client. The preceding picture frame is the last picture frame displayed in the application client before displaying the first picture frame. The picture frame preceding the first picture frame may be referred to as a reference picture frame of the first picture frame. The application server may perform downsampling on the reference picture frame of the first picture frame using the same principle as the first picture frame. The reference picture frame of the first picture frame subjected to downsampling may be referred to as a second adjusted picture frame.

Likewise, the application server may copy the second adjusted picture frame into the blank picture frame. The blank picture frame copied with the second adjusted picture frame may be referred to as a second copied picture frame. The application server may take the second copied picture frame as a reference picture frame of the first copied picture frame, and then code the first copied picture frame according to the second copied picture frame to obtain a picture frame code stream of the first adjusted picture frame.

It is to be understood that a picture frame is generally coded with reference to a picture frame (namely, a reference picture frame) preceding the picture frame. Therefore, the application server may input the first copied picture frame and the second copied picture frame into a coder (the coder may selectively adopt, according to a coding policy thereof, intra-frame coding for some image blocks and adopt inter-frame coding for some image blocks in the first copied picture frame through the second copied picture frame). That is, the first copied picture frame may be coded through the second copied picture frame to obtain a picture frame code stream of the first adjusted picture frame (which may also be referred to as a picture frame code stream of the first copied picture frame). It is to be understood that the picture frame code stream may be taken as a code stream instead for coding the first picture frame. The data volume of the picture frame code stream is much less than the data volume of a code stream for directly coding the first picture frame. This application may adopt H264 (coding standard) or H265 (coding standard) to code a picture frame to obtain a code stream of the picture frame. The code stream is binary data obtained by coding.

In this way, the picture frame preceding the first picture frame of the application client is obtained as the reference picture frame of the first picture frame. Picture reduction adjustment is performed on the reference picture frame of the first picture frame to obtain the second adjusted picture frame. The second adjusted picture frame is copied into the blank picture frame to obtain the second copied picture frame. The first copied picture frame is coded according to the second copied picture frame to obtain the picture frame code stream. It is to be understood that the first copied picture frame may be coded in an inter-frame coding manner. When performing inter-frame coding, the picture frame preceding the first picture frame is taken as the reference picture frame of the first picture frame. With reference to the method for generating the first copied picture frame based on the first picture frame, the second copied picture frame is generated based on the reference picture frame. Thus, the first copied picture frame may be successfully coded according to the second copied picture frame to obtain the picture frame code stream.

And if the data volume of the first picture frame is less than the data volume threshold, the first picture frame may be directly coded to obtain the code stream of the first picture frame.

Figure 5:
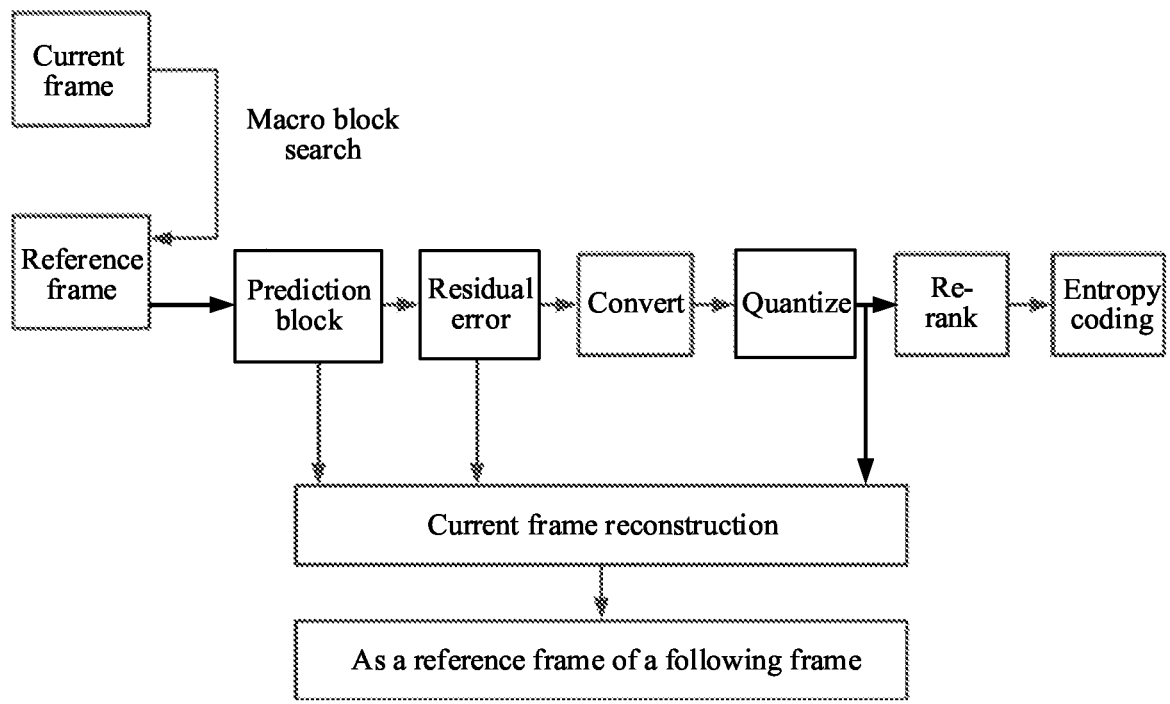
FIG. 5 is a schematic principle diagram of picture frame coding according to this application.

Reference is made to FIG. 5. FIG. 5 is a schematic principle diagram of picture frame coding according to this application. A reference frame (for example, the second copied picture frame) of a current frame (for example, the first copied picture frame) may be searched for a macro block matching each macro block (namely, an image block) in the current frame to obtain a prediction block of the macro block in the current frame.

Further, the application server may obtain a corresponding residual error (which may be obtained by subtracting a macro block from a prediction block thereof) through each macro block in the current frame and the prediction block of the macro block. Further, the residual error may be converted (converting a signal into a frequency domain)→quantized (discarding some unimportant information)→re-ranked (concentrating low frequency parts and concentrating high frequency parts)→entropy-coded (coding into a binary code stream), so as to obtain the coded code stream (for example, the picture frame code stream of the first adjusted picture frame).

The application server may also reconstruct the current frame through the prediction block, the residual error and the quantized result, and may further take the reconstructed current frame (reconstructed picture frame) as a reference frame (namely, reference picture frame) of a following frame.

Step S104: Transmit the picture frame code stream to the application client so that the application client displays a second picture frame according to the picture frame code stream, the second picture frame being obtained after the application client decodes the picture frame code stream to obtain the first adjusted picture frame, and upsamples the first adjusted picture frame back to the first resolution.

In some embodiments, the application server may transmit the picture frame code stream of the first adjusted picture frame obtained by coding to the application client, and then the application client may display the second picture frame according to the picture frame code stream. For example, the application client may decode the picture frame code stream by a decoder to obtain the first copied picture frame, and the application client may extract the first adjusted picture frame from the first copied picture frame. Further, the application client may perform super-resolution processing on the first adjusted picture frame through a super-resolution technology. That is, the resolution of the first adjusted picture frame may be adjusted from the second resolution back to the first resolution, and the first adjusted picture frame after the super-resolution adjustment may be referred to as a second picture frame. The application client may display the second picture frame on an application interface. It is to be understood that the second picture frame displayed by the application client is the first picture frame displayed instead. The second picture frame and the first picture frame have the same picture content and resolution.

Figure 6:
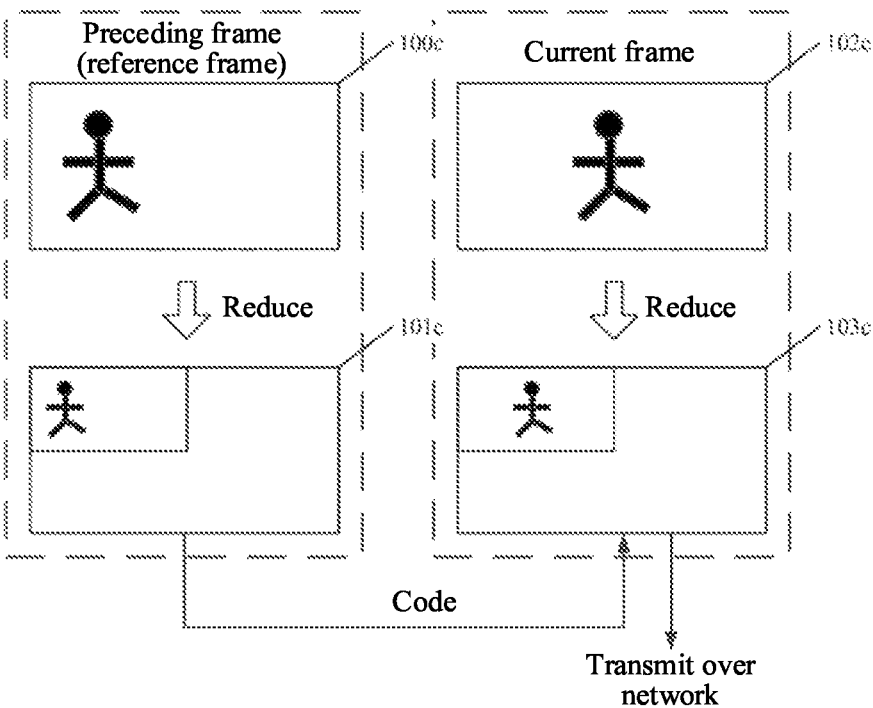
FIG. 6 is a schematic scene diagram of picture frame coding according to this application.

Reference is made to FIG. 6. FIG. 6 is a schematic scene diagram of picture frame coding according to this application. As shown in FIG. 6, a current frame 102c may be the first picture frame, and a preceding frame (namely, a reference frame 100c) may be the reference picture frame of the first picture frame. If the data volume of the current frame 102c is greater than or equal to the data volume threshold, the application server may reduce the reference frame 100c and copy the reference frame into a blank picture frame to obtain the second copied picture frame 101c. The application server may also reduce the current frame 102c and copy the current frame into the blank picture frame to obtain the first copied picture frame 103c. Further, the application server may code the first copied picture frame 103c through the second copied picture frame 101c to obtain a code stream of the first copied picture frame 103c (the code stream may also be referred to as the code stream of the first adjusted picture frame). Further, the application server may transmit the code stream of the first copied picture frame 103c obtained by coding to the application client through the network, so that the application client may display the second picture frame according to the obtained code stream.

Moreover, the application server may also perform super-resolution adjustment on the first adjusted picture frame using a super-resolution technology to obtain a second picture frame. The application server may take the second picture frame as a reference picture frame of a subsequent picture frame after the first picture frame. The reference picture frame of the picture frame following the first picture frame is used for coding the picture frame following the first picture frame. Since coding and decoding need to be kept consistent, the application client can only obtain the second picture frame, but cannot obtain the original first picture frame. Therefore, the application server needs to code the picture frame following the first picture frame through the second picture frame. Subsequently, the application client can decode the code stream of the picture frame following the first picture frame according to the second picture frame.

Figure 7:
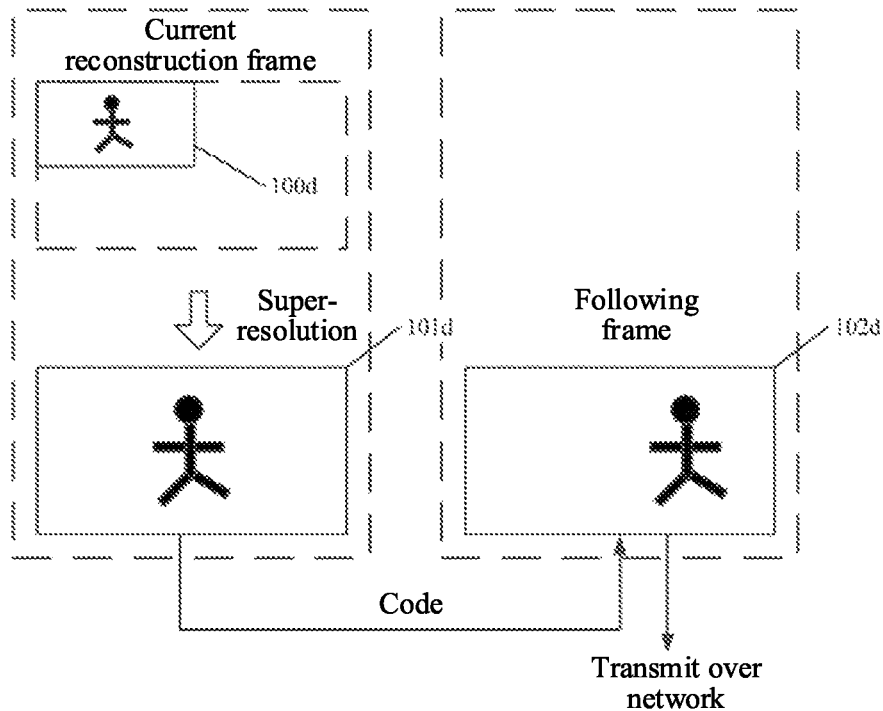
FIG. 7 is a schematic scene diagram of picture frame coding according to this application.

Reference is made to FIG. 7. FIG. 7 is a schematic scene diagram of picture frame coding according to this application. The application server may reconstruct a current frame (namely, reconstructing a first adjusted picture frame 100d) in a manner of performing super-resolution processing on the first adjusted picture frame 100d to obtain a second picture frame 101d with the resolution restored to the first resolution. Subsequently, the application server may code a picture frame 102d following the first picture frame through the second picture frame 101d, and then transmit a code stream obtained by coding to the application client through a network, so that the application client may display the picture frame 102d after decoding the obtained code stream.

Figure 8:
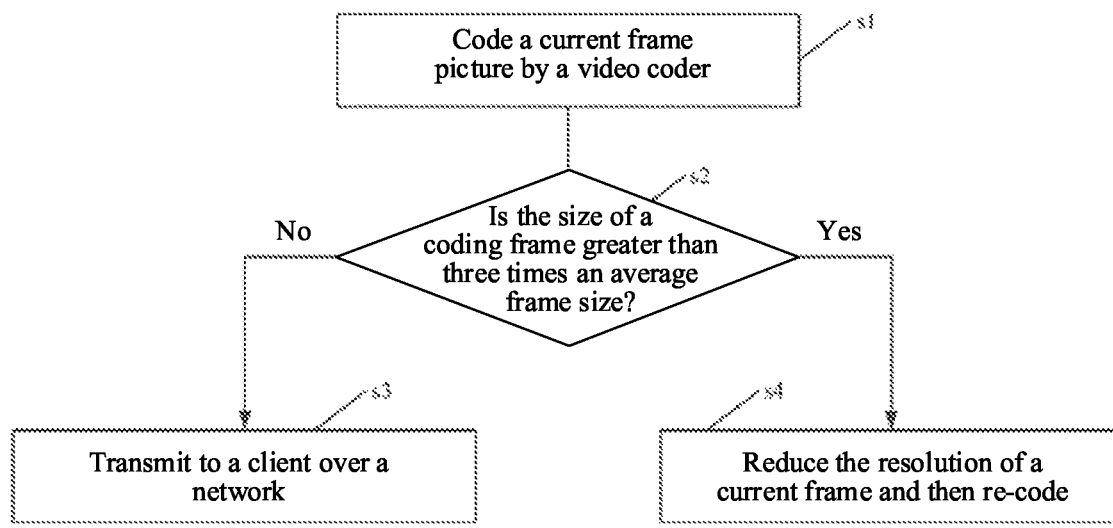
FIG. 8 is a schematic flowchart of picture frame coding according to this application.

Reference is made to FIG. 8. FIG. 8 is a schematic flowchart of picture frame coding according to this application. As shown in FIG. 8, at s1, the application server may code a current frame picture (namely, a picture of a current frame, or a current picture frame) through a video coder. The current frame picture may be the first picture frame. At s2, if the size of a data volume of the coded current frame picture is greater than (or may be greater than or equal to) three times an average frame size (the three times the average frame size may refer to the data volume threshold), step s4 is performed. If the size of the data volume of the coded current frame picture is less than or equal to (or may be less than) three times the average frame size, step s3 is performed. At s3, the current frame picture is directly coded to obtain a code stream of the current frame picture, and the code stream of the current frame picture is transmitted to the application client (namely, client) through a network. At s4, resolution reduction (namely, downsampling) is performed on the current frame picture which is then coded to obtain a corresponding code stream (for example, the code stream of the first adjusted picture frame), and the code stream obtained by coding is transmitted to the application client.

With the method provided in this application, when the data volume of the first picture frame is too large (for example, greater than the data volume threshold), downsampling may be performed on the first picture frame to obtain the first adjusted picture frame to be coded, so as to obtain a picture frame code stream of the first adjusted picture frame. The data volume of the picture frame code stream is greatly reduced compared with a code stream obtained by directly coding the first picture frame. Therefore, the application server may transmit the picture frame code stream to the application client at a higher speed, so that the application client may display a second picture frame used for replacing the first picture frame at a higher speed, the picture frame can be displayed more fluently and quickly, and a user does not feel the display non-fluency of the picture frame.

In this application, when an application server codes a first picture frame of an application client, the application server may detect a data volume of the first picture frame. In response to the data volume of the first picture frame being greater than or equal to a data volume threshold, downsampling is performed on the first picture frame to obtain a first adjusted picture frame. A resolution of the first picture frame is a first resolution, a resolution of the first adjusted picture frame is a second resolution, and the second resolution is less than the first resolution. The first adjusted picture frame is coded to obtain a picture frame code stream of the first adjusted picture frame. The picture frame code stream is transmitted to the application client so that the application client displays a second picture frame according to the picture frame code stream. The second picture frame is obtained after the application client decodes the picture frame code stream to obtain the first adjusted picture frame, and upsamples the first adjusted picture frame back to the first resolution. It can be seen therefrom that through the method provided in this application, an application server may perform downsampling on a scene-switched picture frame (namely, a first picture frame having a data volume greater than or equal to a data volume threshold), code the picture frame to obtain a corresponding code stream, and then transmit the code stream to an application client. The application client may decode the obtained code stream and display the code stream after adjusting a resolution of the decoded picture frame back to an original first resolution. While ensuring the picture quality of the displayed picture frame (for example, a second picture frame), the data volume of the code stream of the transmitted picture frame is reduced, and the transmission speed of the code stream of the picture frame is improved, thereby improving the display fluency of the scene-switched picture frame at the application client.

Figure 9:
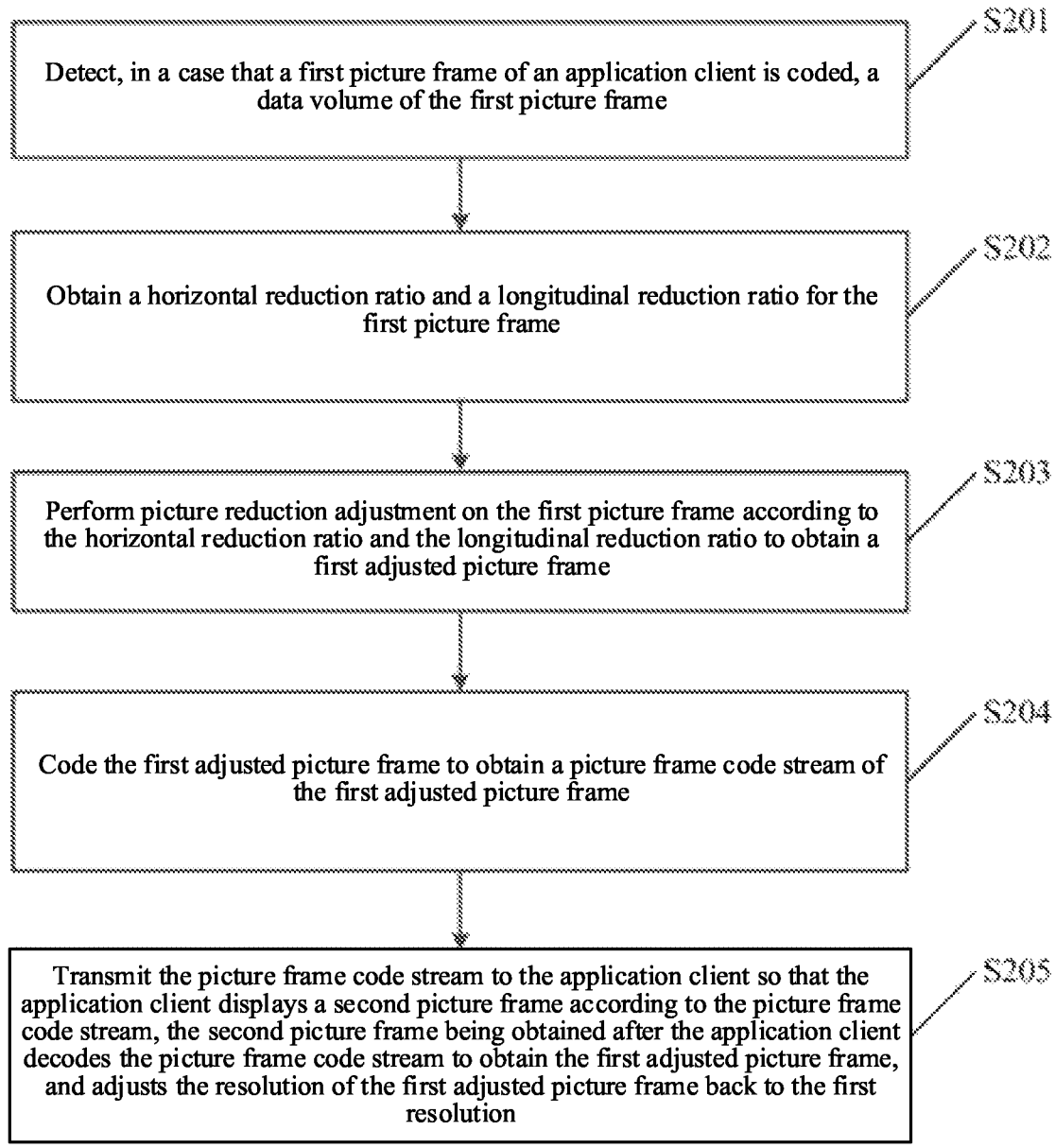
FIG. 9 is a schematic flowchart of a data processing method according to this application.

Reference is made to FIG. 9. FIG. 9 is a schematic flowchart of a data processing method according to this application. The content in this embodiment of this application may be combined with the content described in the embodiment corresponding to FIG. 3, and the executive subject in this embodiment of this application may also be the application server. As shown in FIG. 9, the method may include the following steps:

Step S201: Detect, when a first picture frame of an application client is obtained by coding, a data volume of the first picture frame.

Step S202: Obtain a horizontal reduction ratio and a longitudinal reduction ratio for the first picture frame.

In some embodiments, the application server may obtain a horizontal reduction ratio and a longitudinal reduction ratio for performing downsampling on the first picture frame. The horizontal reduction ratio is used for reducing a length of the first picture frame, and the longitudinal reduction ratio is used for reducing a width of the first picture frame. The horizontal reduction ratio and the longitudinal reduction ratio may be determined according to actual application scenes. This is not limited. For example, the horizontal reduction ratio may be equal to ½, and the longitudinal reduction ratio may be equal to ½.

Step S203: Perform downsampling on the first picture frame according to the horizontal reduction ratio and the longitudinal reduction ratio to obtain a first adjusted picture frame.

In some embodiments, the application server may perform downsampling on the first picture frame according to the horizontal reduction ratio and the longitudinal reduction ratio to obtain the first adjusted picture frame, specifically as follows:

The application server may sample horizontal pixel values (for example, pixel values in the length) in the first picture frame through the horizontal reduction ratio. Pixel values obtained by sampling the horizontal pixel values in the first picture frame may be referred to as horizontal sampled pixel values. For example, if the horizontal reduction ratio is equal to ½, the application server may perform ½ sampling on the horizontal pixel values in the first picture frame. For example, the application server may traverse the horizontal pixel values in the first picture frame, and sample one column of pixel values from two adjacent columns of pixel values which have been traversed. For example, if a first column of pixel values, a second column of pixel values, a third column of pixel values, and a fourth column of pixel values are traversed, a column of horizontal sampled pixel values may be sampled from the first column of pixel values and the second column of pixel values, and a column of horizontal sampled pixel values may be sampled from the third column of pixel values and the fourth column of pixel values.

The application server may sample longitudinal pixel values (for example, pixel values in the length) in the first picture frame through the longitudinal reduction ratio. Pixel values obtained by sampling the longitudinal pixel values in the first picture frame may be referred to as longitudinal sampled pixel values. For example, if the longitudinal reduction ratio is equal to ½, the application server may perform ½ sampling on the longitudinal pixel values in the first picture frame. For example, the application server may traverse the longitudinal pixel values in the first picture frame, and sample one row of pixel values from two adjacent rows of pixel values which have been traversed. For example, if a first row of pixel values, a second row of pixel values, a third row of pixel values, and a fourth row of pixel values are traversed, a row of longitudinal sampled pixel values may be sampled from the first row of pixel values and the second row of pixel values, and a row of longitudinal sampled pixel values may be sampled from the third row of pixel values and the fourth row of pixel values.

Further, the application server may generate the first adjusted picture frame from the horizontal sampled pixel values and the longitudinal sampled pixel values obtained by sampling. The number of pixel values in the first adjusted picture frame is less than the number of pixel values in the first picture frame. That is, the second resolution of the first adjusted picture frame is less than the first resolution of the first picture frame.

In this way, the horizontal pixel values in the first picture frame are sampled based on the horizontal reduction ratio to obtain horizontal sampled pixel values, the longitudinal pixel values in the first picture frame are sampled based on the longitudinal reduction ratio to obtain longitudinal sampled pixel values, and the first adjusted picture frame is generated based on the horizontal sampled pixel values and the longitudinal sampled pixel values. In this way, the first adjusted picture frame may be quickly generated by sampling the horizontal pixel values and the longitudinal pixel values in the first picture frame based on the horizontal reduction ratio and the longitudinal reduction ratio, respectively.

Step S204: Code the first adjusted picture frame to obtain a picture frame code stream of the first adjusted picture frame.

In some embodiments, the application server may code the first adjusted picture frame. For example, the first copied picture frame corresponding to the first adjusted picture frame may be coded through the second copied picture frame, and a code stream obtained by coding at this moment may be referred to as an initial picture frame code stream. Further, the application server may add the horizontal reduction ratio, the longitudinal reduction ratio and a reduction flag to the initial picture frame code stream, and may take the initial picture frame code stream added with the horizontal reduction ratio, the longitudinal reduction ratio and the reduction flag as a picture frame code stream of the first adjusted picture frame obtained finally. In this way, the first adjusted picture frame is coded to obtain an initial picture frame code stream of the first adjusted picture frame, and the horizontal reduction ratio and the longitudinal reduction ratio are added to the initial picture frame code stream to obtain a picture frame code stream. Thus, the application client receives such a picture frame code stream, and may quickly and accurately decode the picture frame code stream based on the horizontal reduction ratio and the longitudinal reduction ratio in the picture frame code stream to obtain the first adjusted picture frame.

Figure 10:
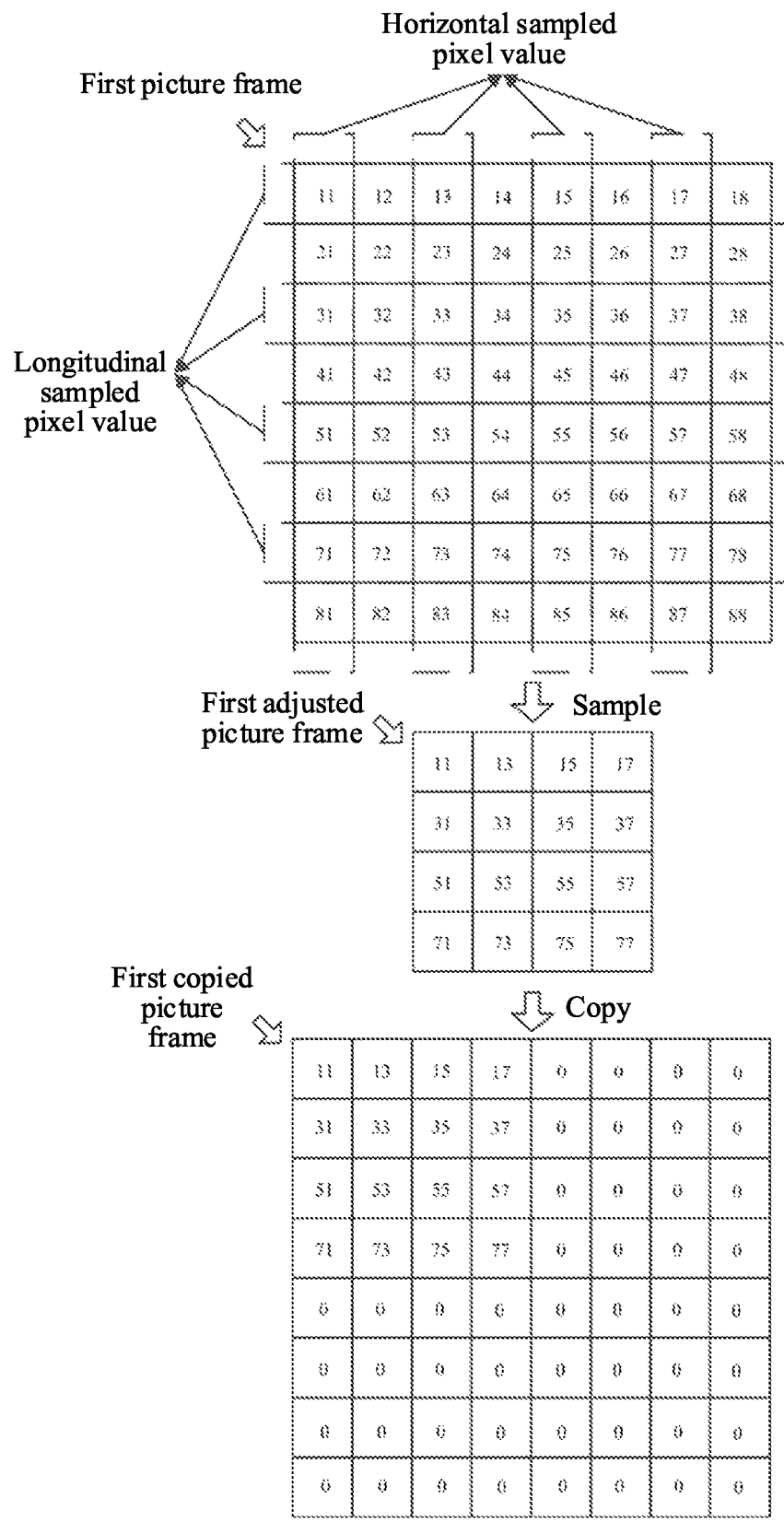
FIG. 10 is a schematic scene diagram of picture frame reduction according to this application.

Reference is made to FIG. 10. FIG. 10 is a schematic scene diagram of picture frame reduction according to this application. As shown in FIG. 10, the first picture frame may include eight rows and eight columns of pixel values. The eight rows and eight columns of pixel values specifically include pixel value 11, pixel value 12, pixel value 13, pixel value 14, pixel value 15, pixel value 16, pixel value 17, pixel value 18, pixel value 21, pixel value 22, pixel value 23, pixel value 24, pixel value 25, pixel value 26, pixel value 27, pixel value 28, pixel value 31, pixel value 32, pixel value 33, pixel value 34, pixel value 35, pixel value 36, pixel value 37, pixel value 38, pixel value 41, pixel value 42, pixel value 43, pixel value 44, pixel value 45, pixel value 46, pixel value 47, pixel value 48, pixel value 51, pixel value 52, pixel value 53, pixel value 54, pixel value 55, pixel value 56, pixel value 57, pixel value 58, pixel value 61, pixel value 62, pixel value 63, pixel value 64, pixel value 65, pixel value 66, pixel value 67, pixel value 68, pixel value 71, pixel value 72, pixel value 73, pixel value 74, pixel value 75, pixel value 76, pixel value 77, pixel value 78, pixel value 81, pixel value 82, pixel value 83, pixel value 84, pixel value 85, pixel value 86, pixel value 87, and pixel value 88.

If both the horizontal reduction ratio and the longitudinal reduction ratio for the first picture frame are equal to ½, ½ sampling may be performed on the horizontal and longitudinal pixel values of the first picture frame. Here, it is assumed that the horizontal sampled pixel values obtained by sampling the horizontal pixel values of the first picture frame are a first column of pixel values (specifically including pixel value 11, pixel value 21, pixel value 31, pixel value 41, pixel value 51, pixel value 61, pixel value 71, and pixel value 81), a third column of pixel values (specifically including pixel value 13, pixel value 23, pixel value 33, pixel value 43, pixel value 53, pixel value 63, pixel value 73, and pixel value 83), a fifth column of pixel values (specifically including pixel value 15, pixel value 25, pixel value pixel value 45, pixel value 55, pixel value 65, pixel value 75, and pixel value 85), and a seventh column of pixel values (specifically including pixel value 17, pixel value 27, pixel value 37, pixel value 47, pixel value 57, pixel value 67, pixel value 77, and pixel value 87) in the first picture frame. The longitudinal sampled pixel values obtained by sampling the longitudinal pixel values of the first picture frame are a first row of pixel values (specifically including pixel value 11, pixel value 12, pixel value 13, pixel value 14, pixel value 15, pixel value 16, pixel value 17, and pixel value 18), a third row of pixel values (specifically including pixel value 31, pixel value 32, pixel value 33, pixel value 34, pixel value 35, pixel value 36, pixel value 37, and pixel value 38), a fifth row of pixel values (specifically including pixel value 51, pixel value 52, pixel value 53, pixel value 54, pixel value 55, pixel value 56, pixel value 57, and pixel value 58), and a seventh row of pixel values (specifically including pixel value 71, pixel value 72, pixel value 73, pixel value 74, pixel value 75, pixel value 76, pixel value 77, and pixel value 78) in the first picture frame.

Then, a first adjusted picture frame may be generated by the intersection between the horizontal sampled pixel values and the longitudinal sampled pixel values obtained by sampling. The first adjusted picture frame includes pixel value 11, pixel value 13, pixel value 15, pixel value 17, pixel value 31, pixel value 33, pixel value 35, pixel value 37, pixel value 51, pixel value 53, pixel value 55, pixel value 57, pixel value 71, pixel value 73, pixel value 75, and pixel value 77. Then the first adjusted picture frame is copied into a blank picture frame of the same size as the first picture frame, so as to obtain a first copied picture frame. At this moment, there are only ¼ of valid data and ¾ of invalid data (namely, 0 data) in the first copied picture frame.

Step S205: Transmit the picture frame code stream to the application client so that the application client displays a second picture frame according to the picture frame code stream, the second picture frame being obtained after the application client decodes the picture frame code stream to obtain the first adjusted picture frame, and upsamples the first adjusted picture frame back to the first resolution.

In the foregoing embodiment, the horizontal reduction ratio and the longitudinal reduction ratio for the first picture frame are obtained, and downsampling is performed on the first picture frame according to the horizontal reduction ratio and the longitudinal reduction ratio to obtain the first adjusted picture frame. In this way, by performing downsampling on the first picture frame according to the horizontal reduction ratio and the longitudinal reduction ratio, the first adjusted picture frame may be quickly obtained.

Figure 11:
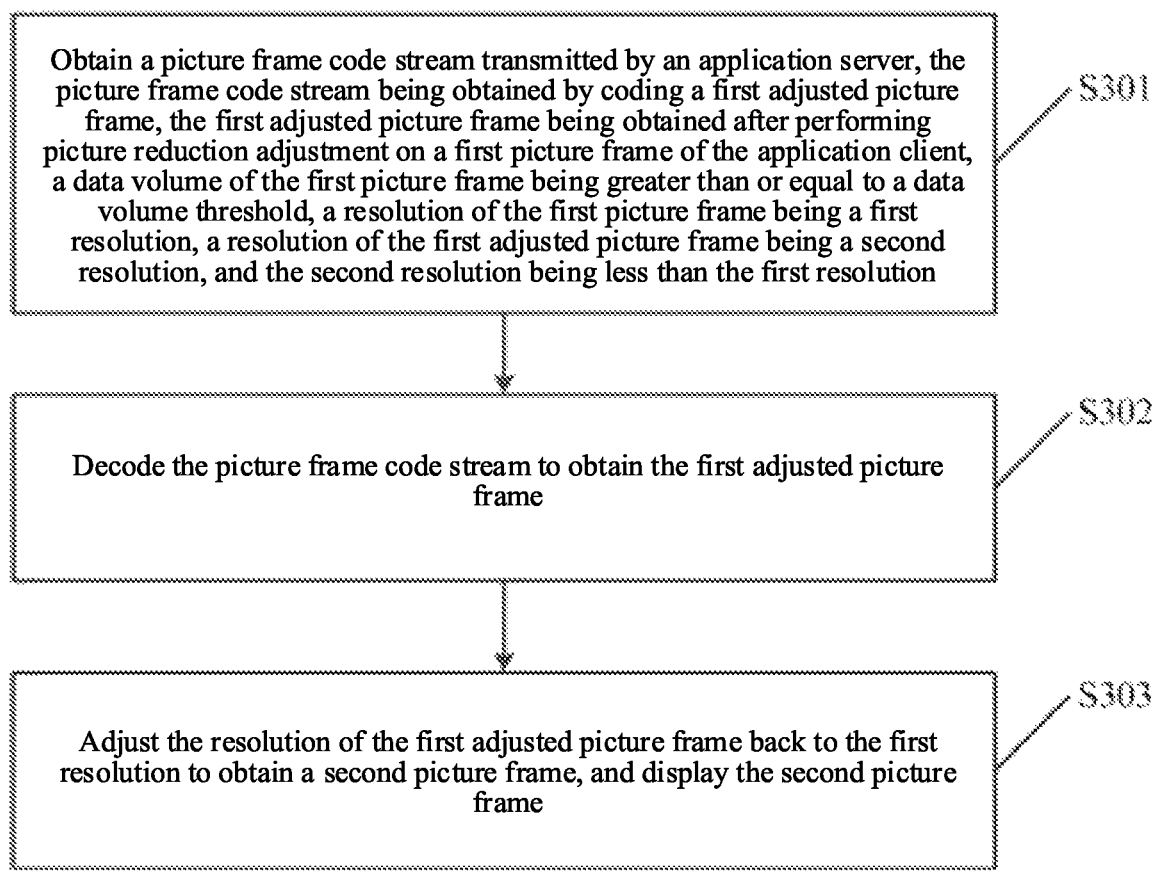
FIG. 11 is a schematic flowchart of a data processing method according to this application.

Reference is made to FIG. 11. FIG. 11 is a schematic flowchart of a data processing method according to this application. The content in this embodiment of this application may be combined with the content described in the embodiment corresponding to FIG. 3. As shown in FIG. 11, the method may include the following steps:

Step S301: Obtain a picture frame code stream transmitted by an application server, the picture frame code stream being obtained by coding a first adjusted picture frame, the first adjusted picture frame being obtained after performing downsampling on a first picture frame of the application client, a data volume of the first picture frame being greater than or equal to a data volume threshold, a resolution of the first picture frame being a first resolution, a resolution of the first adjusted picture frame being a second resolution, and the second resolution being less than the first resolution.

In some embodiments, the executive subject in this embodiment of this application may be the application client. The application client may obtain a picture frame code stream of the first adjusted picture frame transmitted by the application server. The picture frame code stream is obtained by coding the first copied picture frame corresponding to the first adjusted picture frame through the second copied picture frame. The specific manner of obtaining the picture frame code stream may be described with reference to the description in the embodiment corresponding to FIG. 3.

Step S302: Decode the picture frame code stream to obtain the first adjusted picture frame.

In some embodiments, the picture frame code stream obtained by the application client may include a horizontal reduction ratio and a longitudinal reduction ratio for performing downsampling on the first picture frame, and the application client may extract the horizontal reduction ratio and the longitudinal reduction ratio from the picture frame code stream. The application client may also obtain a picture frame preceding the first picture frame. The preceding picture frame may exist in the application client. The preceding picture frame may be a picture frame decoded and displayed by the application client previously. The application client may take the preceding picture frame as a reference picture frame of the first picture frame.

The application client may perform downsampling on the reference picture frame of the first picture frame (the ratio of reduction adjustment is the same as that of the first picture frame) according to the same principle of performing downsampling on the first picture frame to obtain the second adjusted picture frame. The application client may copy the second adjusted picture frame into a blank picture frame with the resolution being the first resolution to obtain the second copied picture frame.

Further, the application client may input the second copied picture frame and the obtained picture frame code stream into a decoder, so as to decode the picture frame code stream through the second copied picture frame to obtain the first copied picture frame.

Moreover, the application client may extract the first adjusted picture frame from the decoded first copied picture frame by extracting the horizontal reduction ratio and the longitudinal reduction ratio from the picture frame code stream.

In this way, the horizontal reduction ratio and the longitudinal reduction ratio are parsed from the picture frame code stream, and the picture frame code stream is decoded to obtain the first copied picture frame. The first copied picture frame is obtained by copying the first adjusted picture frame into a blank picture frame through the application server. A resolution of the blank picture frame is the first resolution. The first adjusted picture frame is extracted from the first copied picture frame according to the horizontal reduction ratio and the longitudinal reduction ratio. It is to be understood that, corresponding to the coding process, the operation of decoding the picture frame code stream may obtain the first copied picture frame with the resolution being the first resolution. Further, based on the horizontal reduction ratio and the longitudinal reduction ratio parsed from the picture frame code stream, the accurate first adjusted picture frame with the resolution being the second resolution may be extracted from the first copied picture frame.

The picture frame preceding the first picture frame of the application client is obtained as the reference picture frame of the first picture frame. Picture reduction adjustment is performed on the reference picture frame of the first picture frame to obtain the second adjusted picture frame. The second adjusted picture frame is copied into the blank picture frame to obtain the second copied picture frame. The picture frame code stream is decoded according to the second copied picture frame to obtain the first copied picture frame. It is to be understood that the picture frame code stream may be decoded in an inter-frame decoding manner. When performing inter-frame decoding, the picture frame preceding the first picture frame in the application client is taken as the reference picture frame of the first picture frame. With reference to the method for generating the first copied picture frame based on the first picture frame, the second copied picture frame is generated based on the reference picture frame. The first copied picture frame and the second copied picture frame are picture frames with the same resolution. Thus, the first copied picture frame may be obtained by successfully decoding the picture frame code stream according to the second copied picture frame.

Step S303: Adjust the resolution of the first adjusted picture frame back to the first resolution to obtain a second picture frame, and display the second picture frame.

In some embodiments, the application client may perform super-resolution adjustment on the first adjusted picture frame through the horizontal reduction ratio and the longitudinal reduction ratio so as to obtain a second picture frame. The resolution of the second picture frame is the first resolution of the first picture frame. In this way, the application client performs super-resolution adjustment on the first adjusted picture frame through the horizontal reduction ratio and the longitudinal reduction ratio, so that the resolution of the second picture frame obtained by adjustment is the first resolution of the first picture frame, thereby ensuring that the resolutions of the picture frames displayed by the application client are all the same as original resolutions.

Figure 12:
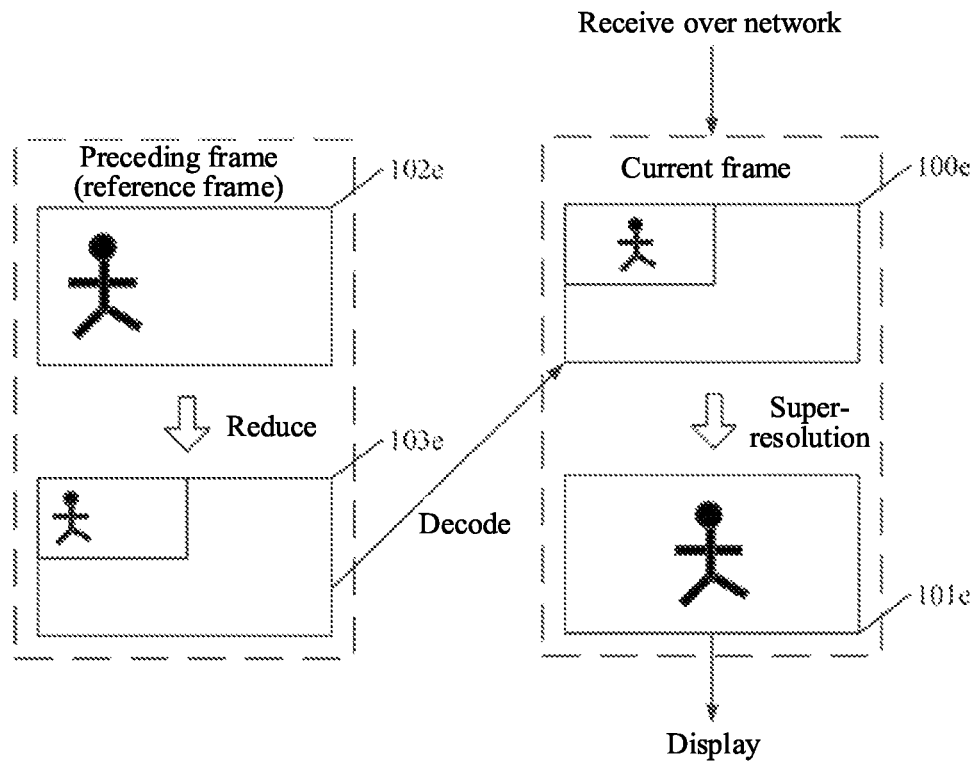
FIG. 12 is a schematic scene diagram of picture frame decoding according to this application.

Reference is made to FIG. 12. FIG. 12 is a schematic scene diagram of picture frame decoding according to this application. As shown in FIG. 12, the application client may receive a code stream of a current frame (for example, the picture frame code stream of the first adjusted picture frame) transmitted by the application server through the network. The application client may obtain a frame preceding the current frame (namely, the picture frame preceding the first picture frame) as a reference frame 102e (namely, a reference picture frame). At this moment, the resolution size of the reference frame 102e is the first resolution. The application client may reduce the reference frame and copy the reference frame into a blank picture frame to obtain the second copied picture frame 103e. Further, the application client may decode the code stream of the current frame through the second copied picture frame 103e, thereby obtaining the first copied picture frame 100e. The application client may perform super-resolution processing on an image block (namely, a first adjusted picture frame) corresponding to the first adjusted picture frame in the first copied picture frame 100e. That is, a second picture frame 101e with the resolution being the first resolution may be obtained, and the second picture frame 101e may be displayed in a client interface of the application client.

Figure 13:
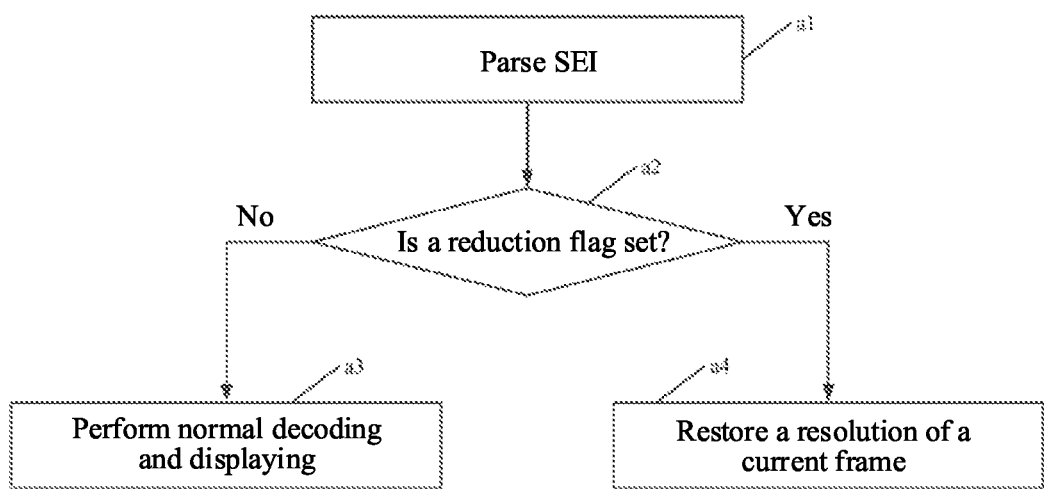
FIG. 13 is a schematic flowchart of picture frame decoding according to this application.

Reference is made to FIG. 13. FIG. 13 is a schematic flowchart of picture frame decoding according to this application. As shown in FIG. 13, at a1, the application client may parse supplemental enhancement information (SEI) in the obtained code stream, and determine whether a reduction flag is set in the parsed SEI, namely, determine whether the SEI includes a flag for indicating that a picture frame is reduced. At a2, if the SEI includes the flag for indicating that the picture frame is reduced, it indicates that the picture frame is reduced, and step a4 is performed. If the SEI does not include the flag for indicating that the picture frame is reduced, it indicates that the picture frame is not reduced, and step a3 is performed. At a3, the application client may directly normally decode the obtained code stream and display the decoded picture frame. At a4, the application client needs to decode the code stream through a reference picture frame (for example, a second adjusted picture frame) with the resolution reduced, needs to restore the resolution of the decoded picture frame (for example, a first adjusted picture frame) back to the first resolution, and then displays the corresponding picture frame (for example, the second picture frame).

With the method provided in this application, the application server may take a code stream of a first adjusted picture frame as a code stream of a first picture frame to be transmitted to the application client, thereby reducing the transmission data volume for the code stream of the first picture frame, and improving the transmission speed for the code stream of the first picture frame, so that the application client may output a second picture frame for replacing the first picture frame with a smaller delay, and it is ensured that the resolution of the second picture frame is the same as the resolution of the first picture frame. That is, the display effect (for example, definition) of pictures is ensured.

In this application, when an application server codes a first picture frame of an application client, the application server may detect a data volume of the first picture frame. In response to the data volume of the first picture frame being greater than or equal to a data volume threshold, downsampling is performed on the first picture frame to obtain a first adjusted picture frame. A resolution of the first picture frame is a first resolution, a resolution of the first adjusted picture frame is a second resolution, and the second resolution is less than the first resolution. The first adjusted picture frame is coded to obtain a picture frame code stream of the first adjusted picture frame. The picture frame code stream is transmitted to the application client so that the application client displays a second picture frame according to the picture frame code stream. The second picture frame is obtained after the application client decodes the picture frame code stream to obtain the first adjusted picture frame, and upsamples the first adjusted picture frame back to the first resolution. It can be seen therefrom that through the method provided in this application, an application server may perform downsampling on a scene-switched picture frame (namely, a first picture frame having a data volume greater than or equal to a data volume threshold), code the picture frame to obtain a corresponding code stream, and then transmit the code stream to an application client. The application client may decode the obtained code stream and display the code stream after adjusting a resolution of the decoded picture frame back to an original first resolution. While ensuring the picture quality of the displayed picture frame (for example, a second picture frame), the data volume of the code stream of the transmitted picture frame is reduced, and the transmission speed of the code stream of the picture frame is improved, thereby improving the display fluency of the scene-switched picture frame at the application client.

Figure 14:
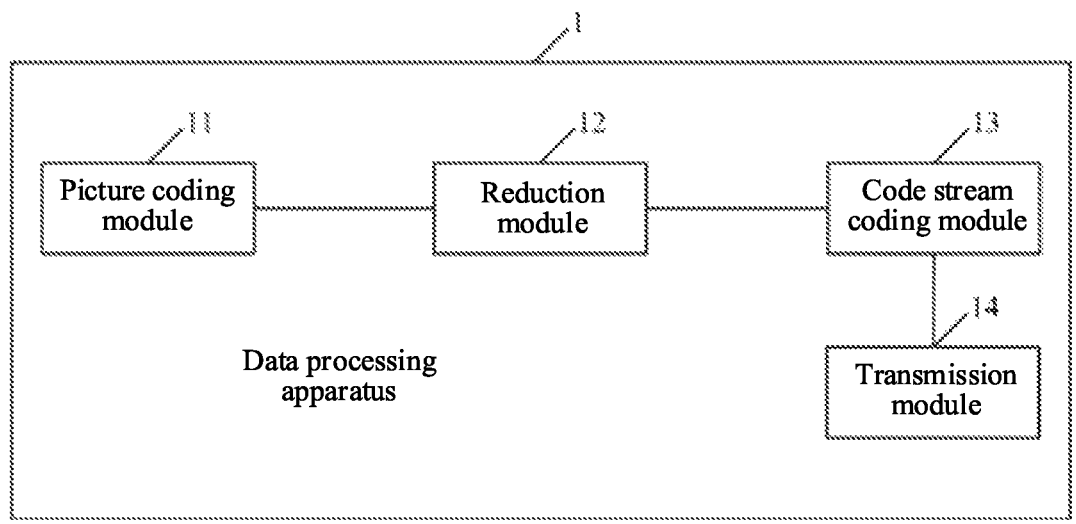
FIG. 14 is a schematic structural diagram of a data processing apparatus according to this application.

Reference is made to FIG. 14. FIG. 14 is a schematic structural diagram of a data processing apparatus according to this application. The data processing apparatus may be a computer-readable instruction (including program codes) running in a computer device. For example, the data processing apparatus is application software. The data processing apparatus may be configured to perform the corresponding steps in the method according to the foregoing embodiment of this application. As shown in FIG. 14, the data processing apparatus 1 may include: a picture coding module 11, a reduction module 12, a code stream coding module 13, and a transmission module 14.

The picture coding module 11 is configured to detect, when a first picture frame of an application client is coded, a data volume of the first picture frame.

The reduction module 12 is configured to perform, in response to the data volume of the first picture frame being greater than or equal to a data volume threshold, downsampling on the first picture frame to obtain a first adjusted picture frame. A resolution of the first picture frame is a first resolution, a resolution of the first adjusted picture frame is a second resolution, and the second resolution is less than the first resolution.

The code stream coding module 13 is configured to code the first adjusted picture frame to obtain a picture frame code stream of the first adjusted picture frame.

The transmission module 14 is configured to transmit the picture frame code stream to the application client so that the application client displays a second picture frame according to the picture frame code stream. The second picture frame is obtained after the application client decodes the picture frame code stream to obtain the first adjusted picture frame, and upsamples the first adjusted picture frame back to the first resolution.

In some embodiments, the manner of performing, by the reduction module 12, downsampling on the first picture frame to obtain a first adjusted picture frame includes:
  obtaining a horizontal reduction ratio and a longitudinal reduction ratio for the first picture frame; and
  performing downsampling on the first picture frame according to the horizontal reduction ratio and the longitudinal reduction ratio to obtain the first adjusted picture frame.

In some embodiments, the manner of performing, by the reduction module 12, downsampling on the first picture frame according to the horizontal reduction ratio and the longitudinal reduction ratio to obtain the first adjusted picture frame includes:
  sampling a horizontal pixel value in the first picture frame based on the horizontal reduction ratio to obtain a horizontal sampled pixel value;
  sampling a longitudinal pixel value in the first picture frame based on the longitudinal reduction ratio to obtain a longitudinal sampled pixel value; and
  generating the first adjusted picture frame based on the horizontal sampled pixel value and the longitudinal sampled pixel value.

In some embodiments, the manner of coding, by the code stream coding module 13, the first adjusted picture frame to obtain a picture frame code stream of the first adjusted picture frame includes:
  coding the first adjusted picture frame to obtain an initial picture frame code stream of the first adjusted picture frame; and
  adding the horizontal reduction ratio and the longitudinal reduction ratio to the initial picture frame code stream to obtain the picture frame code stream.

In some embodiments, the manner of coding, by the code stream coding module 13, the first adjusted picture frame to obtain a picture frame code stream of the first adjusted picture frame includes:
  obtaining a blank picture frame with a resolution being the first resolution;
  copying the first adjusted picture frame into the blank picture frame to obtain a first copied picture frame; and coding the first copied picture frame to obtain the picture frame code stream.

In some embodiments, the manner of coding, by the code stream coding module 13, the first copied picture frame to obtain the picture frame code stream includes:

obtaining a picture frame preceding the first picture frame of the application client as a reference picture frame of the first picture frame;

performing downsampling on the reference picture frame of the first picture frame to obtain a second adjusted picture frame;

copying the second adjusted picture frame into the blank picture frame to obtain a second copied picture frame; and coding the first copied picture frame according to the second copied picture frame to obtain the picture frame code stream.

In some embodiments, the application client is a game client. The manner of performing, by the reduction module 12 in response to the data volume of the first picture frame being greater than or equal to a data volume threshold, downsampling on the first picture frame to obtain a first adjusted picture frame includes:

performing downsampling on the first picture frame to obtain the first adjusted picture frame in response to the first picture frame belonging to a game picture frame of the game client during scene switching and the data volume of the first picture frame being greater than or equal to the data volume threshold.

In some embodiments, the apparatus 1 is further configured to:

obtain a unit transmission data volume and a unit transmission frame number for a picture frame of the application client;

determine an average frame data volume according to the unit transmission data volume and the unit transmission frame number; and determine the data volume threshold according to the average frame data volume.

In some embodiments, the apparatus 1 is further configured to:

perform super-resolution adjustment on the first adjusted picture frame to obtain the second picture frame; and take the second picture frame as a reference picture frame of a subsequent picture frame after the first picture frame, the reference picture frame of the picture frame following the first picture frame being used for coding the picture frame following the first picture frame.

According to one embodiment of this application, the steps involved in the data processing method shown in FIG. 3 may be performed by the various modules in the data processing apparatus 1 shown in FIG. 14. For example, step S101 shown in FIG. 3 may be performed by the picture coding module 11 in FIG. 14, and step S102 shown in FIG. 3 may be performed by the reduction module 12 in FIG. 14. Step S103 shown in FIG. 3 may be performed by the code stream coding module 13 in FIG. 14, and step S104 shown in FIG. 3 may be performed by the transmission module 14 in FIG. 14.

In this application, when an application server codes a first picture frame of an application client, the application server may detect a data volume of the first picture frame. In response to the data volume of the first picture frame being greater than or equal to a data volume threshold, downsampling is performed on the first picture frame to obtain a first adjusted picture frame. A resolution of the first picture frame is a first resolution, a resolution of the first adjusted picture frame is a second resolution, and the second resolution is less than the first resolution. The first adjusted picture frame is coded to obtain a picture frame code stream of the first adjusted picture frame. The picture frame code stream is transmitted to the application client so that the application client displays a second picture frame according to the picture frame code stream. The second picture frame is obtained after the application client decodes the picture frame code stream to obtain the first adjusted picture frame, and upsamples the first adjusted picture frame back to the first resolution. It can be seen therefrom that through the apparatus provided in this application, an application server may perform downsampling on a scene-switched picture frame (namely, a first picture frame having a data volume greater than or equal to a data volume threshold), code the picture frame to obtain a corresponding code stream, and then transmit the code stream to an application client. The application client may decode the obtained code stream and display the code stream after adjusting a resolution of the decoded picture frame back to an original first resolution. While ensuring the picture quality of the displayed picture frame (for example, a second picture frame), the data volume of the code stream of the transmitted picture frame is reduced, and the transmission speed of the code stream of the picture frame is improved, thereby improving the display fluency of the scene-switched picture frame at the application client.

According to one embodiment of this application, various modules in the data processing apparatus 1 shown in FIG. 14 may be respectively or completely combined into one or more units to constitute the apparatus, or some unit(s) therein may be further divided into a plurality of functionally smaller subunits, and the same operation may be realized without affecting the achievement of the technical effects of this embodiment of this application. The modules are divided based on logical functions. In practice, the functions of one module may also be realized by a plurality of units, or the functions of a plurality of modules may be realized by one unit. In other embodiments of this application, the data processing apparatus 1 may also include other units. In practice, the functions may also be realized with the aid of other units, and may be realized in cooperation by a plurality of units.

According to one embodiment of this application, the data processing apparatus 1 shown in FIG. 14 may be constructed and a data processing method according to an embodiment of this application may be implemented by running computer-readable instructions (including program codes) that can perform the steps of the corresponding method shown in FIG. 3 on processing elements and storage elements including a central processing unit (CPU), a random access memory (RAM), a read-only memory (ROM), and so on, for example, general computer devices of computers. The computer-readable instructions may be recorded in, for example, a computer-readable recording medium, may be loaded into the computing device by using the computer-readable recording medium, and run in the computing device.

Figure 15:
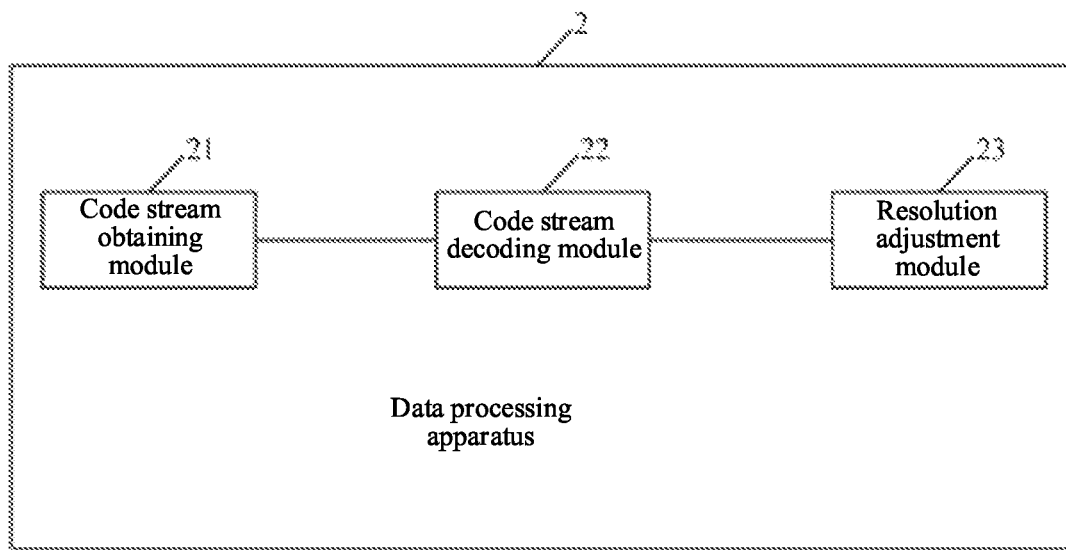
FIG. 15 is a schematic structural diagram of a data processing apparatus according to this application.

Reference is made to FIG. 15. FIG. 15 is a schematic structural diagram of a data processing apparatus according to this application. The data processing apparatus may be a computer-readable instruction (including program codes) running in a computer device. For example, the data processing apparatus is application software. The data processing apparatus may be configured to perform the corresponding steps in the method according to the foregoing embodiment of this application. As shown in FIG. 15, the data processing apparatus 2 may include: a code stream obtaining module 21, a code stream decoding module 22, and a resolution adjustment module 23.

The code stream obtaining module 21 is configured to obtain a picture frame code stream transmitted by an application server. The picture frame code stream is obtained by coding a first adjusted picture frame, and the first adjusted picture frame is obtained after performing downsampling on a first picture frame of the application client. A data volume of the first picture frame is greater than or equal to a data volume threshold. A resolution of the first picture frame is a first resolution, a resolution of the first adjusted picture frame is a second resolution, and the second resolution is less than the first resolution.

The code stream decoding module 22 is configured to decode the picture frame code stream to obtain the first adjusted picture frame.

The resolution adjustment module 23 is configured to adjust the resolution of the first adjusted picture frame back to the first resolution to obtain a second picture frame, and display the second picture frame.

In some embodiments, the picture frame code stream includes a horizontal reduction ratio and a longitudinal reduction ratio for the first picture frame during the downsampling of the first picture frame.

The manner of decoding, by the code stream decoding module 22, the picture frame code stream to obtain the first adjusted picture frame includes:

parsing the horizontal reduction ratio and the longitudinal reduction ratio from the picture frame code stream;

decoding the picture frame code stream to obtain a first copied picture frame, the first copied picture frame being obtained by copying the first adjusted picture frame into a blank picture frame through the application server, and a resolution of the blank picture frame being the first resolution; and extracting the first adjusted picture frame from the first copied picture frame according to the horizontal reduction ratio and the longitudinal reduction ratio.

In some embodiments, the manner of adjusting, by the resolution adjustment module 23, the resolution of the first adjusted picture frame back to the first resolution to obtain a second picture frame includes:

performing super-resolution adjustment on the first adjusted picture frame based on the horizontal reduction ratio and the longitudinal reduction ratio; and determining the first adjusted picture frame after super-resolution adjustment as the second picture frame.

In some embodiments, the manner of decoding, by the code stream decoding module 22, the picture frame code stream to obtain a first copied picture frame includes:

obtaining a picture frame preceding the first picture frame in the application client as a reference picture frame of the first picture frame;

performing downsampling on the reference picture frame of the first picture frame to obtain a second adjusted picture frame;

copying the second adjusted picture frame into the blank picture frame to obtain a second copied picture frame; and decoding the picture frame code stream according to the second copied picture frame to obtain the first copied picture frame.

According to one embodiment of this application, the steps involved in the data processing method shown in FIG. 11 may be performed by the various modules in the data processing apparatus 2 shown in FIG. 15. For example, step S301 shown in FIG. 11 may be performed by the code stream obtaining module 21 in FIG. 11, and step S302 shown in FIG. 11 may be performed by the code stream decoding module 22 in FIG. 11. Step S303 shown in FIG. 11 may be performed by the resolution adjustment module 23 in FIG. 11.

In this application, when an application server codes a first picture frame of an application client, the application server may detect a data volume of the first picture frame. In response to the data volume of the first picture frame being greater than or equal to a data volume threshold, downsampling is performed on the first picture frame to obtain a first adjusted picture frame. A resolution of the first picture frame is a first resolution, a resolution of the first adjusted picture frame is a second resolution, and the second resolution is less than the first resolution. The first adjusted picture frame is coded to obtain a picture frame code stream of the first adjusted picture frame. The picture frame code stream is transmitted to the application client so that the application client displays a second picture frame according to the picture frame code stream. The second picture frame is obtained after the application client decodes the picture frame code stream to obtain the first adjusted picture frame, and upsamples the first adjusted picture frame back to the first resolution. It can be seen therefrom that through the apparatus provided in this application, an application server may perform downsampling on a scene-switched picture frame (namely, a first picture frame having a data volume greater than or equal to a data volume threshold), code the picture frame to obtain a corresponding code stream, and then transmit the code stream to an application client. The application client may decode the obtained code stream and display the code stream after adjusting a resolution of the decoded picture frame back to an original first resolution. While ensuring the picture quality of the displayed picture frame (for example, a second picture frame), the data volume of the code stream of the transmitted picture frame is reduced, and the transmission speed of the code stream of the picture frame is improved, thereby improving the display fluency of the scene-switched picture frame at the application client.

According to one embodiment of this application, various modules in the data processing apparatus 2 shown in FIG. 15 may be respectively or completely combined into one or more units to constitute the apparatus, or some unit(s) therein may be further divided into a plurality of functionally smaller subunits, and the same operation may be realized without affecting the achievement of the technical effects of this embodiment of this application. The modules are divided based on logical functions. In practice, the functions of one module may also be realized by a plurality of units, or the functions of a plurality of modules may be realized by one unit. In other embodiments of this application, the data processing apparatus 2 may also include other units. In practice, the functions may also be realized with the aid of other units, and may be realized in cooperation by a plurality of units.

According to one embodiment of this application, the data processing apparatus 2 shown in FIG. 15 may be constructed and a data processing method according to an embodiment of this application may be implemented by running computer-readable instructions (including program codes) that can perform the steps of the corresponding method shown in FIG. 11 on processing elements and storage elements including a central processing unit (CPU), a random access memory (RAM), a read-only memory (ROM), and so on, for example, general computer devices of computers. The computer-readable instructions may be recorded in, for example, a computer-readable recording medium, may be loaded into the foregoing computing device by using the computer-readable recording medium, and run in the computing device.

Figure 16:
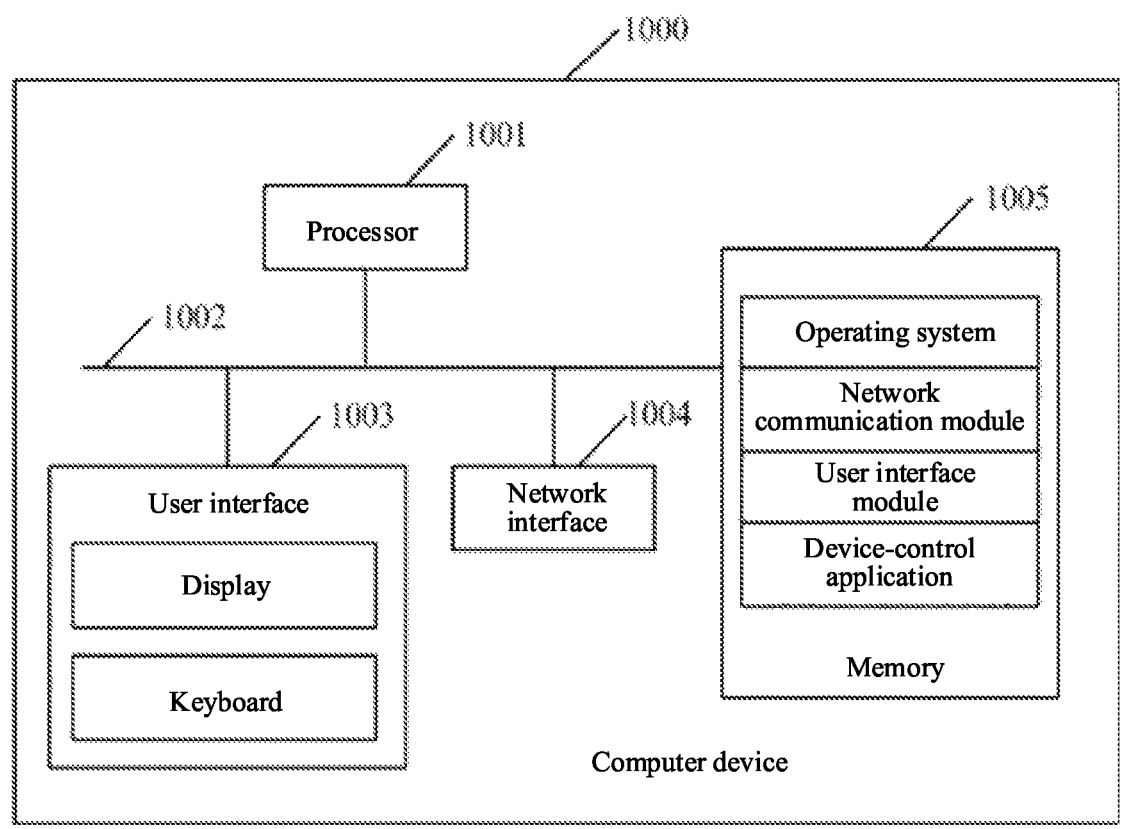
FIG. 16 is a schematic structural diagram of a computer device according to this application.

Reference is made to FIG. 16. FIG. 16 is a schematic structural diagram of a computer device according to this application. As shown in FIG. 16, the computer device 1000 may include: one or more processors 1001, a network interface 1004, and a memory 1005. Furthermore, the computer device 1000 may further include: a user interface 1003 and at least one communication bus 1002. The communication bus 1002 is configured to implement connection and communication between the components. The user interface 1003 may include a display, a keyboard. In some embodiments, the user interface 1003 may further include a standard wired interface and a standard wireless interface. In some embodiments, the network interface 1004 may include a standard wired interface and a standard wireless interface (such as a WI-FI interface). The memory 1005 may be a high-speed random access memory (RAM), or may be a non-volatile memory, for example, at least one magnetic disk memory. In some embodiments, the memory 1005 may be at least one storage apparatus that is located far away from the foregoing one or more processors 1001. As shown in FIG. 16, the memory 1005 used as a computer storage medium may include an operating system, a network communication module, a user interface module, and a device-control application.

In the computer device 1000 shown in FIG. 16, the network interface 1004 may provide a network communication function. The user interface 1003 is mainly used as an interface enabling input by a user. The one or more processors 1001 may be configured to invoke the device-control application stored in the memory 1005 to:

detect, when a first picture frame of an application client is coded, a data volume of the first picture frame;

perform, in response to the data volume of the first picture frame being greater than or equal to a data volume threshold, downsampling on the first picture frame to obtain a first adjusted picture frame, a resolution of the first picture frame being a first resolution, a resolution of the first adjusted picture frame being a second resolution, and the second resolution being less than the first resolution;

code the first adjusted picture frame to obtain a picture frame code stream of the first adjusted picture frame; and transmit the picture frame code stream to the application client so that the application client displays a second picture frame according to the picture frame code stream, the second picture frame being obtained after the application client decodes the picture frame code stream to obtain the first adjusted picture frame, and upsamples the first adjusted picture frame back to the first resolution.

In some embodiments, the one or more processors 1001 may be further configured to invoke the device-control application stored in the memory 1005 to:

obtain a picture frame code stream transmitted by an application server, the picture frame code stream being obtained by coding a first adjusted picture frame, the first adjusted picture frame being obtained after performing downsampling on a first picture frame of the application client, a data volume of the first picture frame being greater than or equal to a data volume threshold, a resolution of the first picture frame being a first resolution, a resolution of the first adjusted picture frame being a second resolution, and the second resolution being less than the first resolution;

decode the picture frame code stream to obtain the first adjusted picture frame; and adjust the resolution of the first adjusted picture frame back to the first resolution to obtain a second picture frame, and display the second picture frame.

It is to be understood that the computer device 1000 described in this embodiment of this application may perform the description of the data processing method in the embodiment corresponding to FIG. 3 or FIG. 11, as well as the description of data processing apparatus 1 in the embodiment corresponding to FIG. 14 and the description of the data processing apparatus 2 in the embodiment corresponding to FIG. 15. No description will be repeated herein. In addition, the description of beneficial effects of the same method will not be repeated.

Furthermore, this application also provides a non-transitory computer-readable storage medium. Computer programs executed by the aforementioned data processing apparatus 1 and data processing apparatus 2 are stored in the computer-readable storage medium. The computer programs include computer-readable program instructions. When one or more processors execute the computer-readable program instructions, the description of the data processing method in the embodiment corresponding to FIG. 3 or FIG. 11 can be performed. Therefore, no description will be repeated herein. In addition, the description of beneficial effects of the same method will not be repeated. For technical details that are not disclosed in the computer storage medium embodiment involved in this application, reference is made to the description of the method embodiment of this application.

As an example, the program instructions may be deployed to be executed on one computer device, or on a plurality of computer devices located at one site, or on a plurality of computer devices distributed across a plurality of sites and interconnected by a communication network. The plurality of computer devices distributed across the plurality of sites and interconnected by the communication network may form a blockchain network.

The non-transitory computer-readable storage medium may be the data processing apparatus according to any of the foregoing embodiments or an internal storage unit of the computer device, for example, a hard disk or an internal memory of the computer device. The computer-readable storage medium may also be an external storage device of the computer device, for example, a plug-in hard disk, a smart media card (SMC), a secure digital (SD) card, or a flash card provided on the computer device. Further, the computer-readable storage medium may also include both the internal storage unit and the external storage device of the computer device. The computer-readable storage medium is configured to store the computer-readable instructions and other programs and data required by the computer device. The computer-readable storage medium may be further configured to temporarily store data that has been outputted or is to be outputted.

This application provides a computer program product or computer program. The computer program product or computer program includes computer instructions. The computer instructions are stored in a non-transitory computer-readable storage medium. One or more processors of a computer device read the computer-readable instructions from the computer-readable storage medium. The one or more processors execute the computer-readable instructions, so as to enable the computer device to perform the description of the data processing method in the embodiment corresponding to FIG. 3 or FIG. 11. Therefore, no description will be repeated herein. In addition, the description of beneficial effects of the same method will not be repeated. For technical details that are not disclosed in the computer-readable storage medium embodiment involved in this application, reference is made to the description of the method embodiment of this application.

The terms "first", "second", and the like in the specification, in the claims and in the drawings of the embodiments of this application are used for distinguishing between different objects and not necessarily for describing a particular sequence. Furthermore, the terms "include" and any variations thereof are intended to cover a non-exclusive inclusion. For example, a process, method, apparatus, product, or device that contains a list of steps or units is not limited to the listed steps or modules, but may include steps or modules not listed, or may include other step units inherent to such process, method, apparatus, product, or device.

A person of ordinary skill in the art may be aware that, units and algorithm steps of the examples described in the disclosed embodiments in this specification may be implemented by electronic hardware, computer software, or a combination thereof. To clearly describe the interchangeability between the hardware and the software, the foregoing has generally described compositions and steps of the examples based on functions. Whether the functions are executed in the manner of hardware or software depends on particular applications and design constraint conditions of the technical solutions. A person skilled in the art may use different methods to implement the described functions for each particular application, but it is not to be considered that the implementation goes beyond the scope of this application.

The method and related apparatus according to the embodiments of this application are described with reference to method flowcharts and/or schematic structural diagrams provided by the embodiments of this application. Specifically, each procedure and/or block of the method flowcharts and/or schematic structural diagrams and combinations of procedures and/or blocks in the flowcharts and/or block diagrams may be implemented by computer-readable instructions. The computer-readable instructions may be provided for a general-purpose computer, a special-purpose computer, an embedded processor, or one or more processors of another programmable data processing device to generate a machine, so that an apparatus for implementing functions specified in one or more procedures of the flowcharts and/or one or more blocks of the block diagrams is generated via instructions executed by the computer or the one or more processors of the another programmable data processing device. The computer-readable instructions may also be stored in a computer-readable memory that can guide the computer or the another programmable data processing device to work in a specific manner, so that the instructions stored in the computer-readable memory generate a product that includes an instruction apparatus. The instruction apparatus implements a specific function in one or more procedures of the flowcharts and/or in one or more blocks of the schematic structural diagrams. The computer-readable instructions may also be loaded onto the computer or another programmable data processing device, so that a series of operations and steps are performed on the computer or another programmable device to generate computer-implemented processing. Thus, the instructions executed on the computer or another programmable device provide steps for implementing a specific function in one or more procedures of the flowcharts and/or in one or more blocks of the schematic structural diagrams.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data processing method performed by a computer device, the method comprising:
   detecting a data volume of a first picture frame after being coded;
   in response to the data volume of the first picture frame being greater than or equal to a data volume threshold, performing downsampling on the first picture frame to obtain a first adjusted picture frame, wherein the first picture frame corresponds to a scene switching of a computer gaming application and the data volume threshold is based on an average frame data volume of the computer gaming application;
   coding the first adjusted picture frame to obtain a picture frame code stream of the first adjusted picture frame; and
   transmitting the picture frame code stream to an application client at a terminal, wherein the application client decodes the picture frame code stream to obtain a first adjusted picture frame; upsamples the first adjusted picture frame to obtain the second picture frame having a same resolution as the first picture frame; and displays the second picture frame at the terminal.

2. The method according to claim 1, wherein the performing downsampling on the first picture frame to obtain a first adjusted picture frame comprises:
   obtaining a horizontal reduction ratio and a longitudinal reduction ratio for the first picture frame; and
   performing downsampling on the first picture frame according to the horizontal reduction ratio and the longitudinal reduction ratio to obtain the first adjusted picture frame.

3. The method according to claim 2, wherein the performing downsampling on the first picture frame according to the horizontal reduction ratio and the longitudinal reduction ratio to obtain the first adjusted picture frame comprises:
   sampling a horizontal pixel value in the first picture frame based on the horizontal reduction ratio to obtain a horizontal sampled pixel value;
   sampling a longitudinal pixel value in the first picture frame based on the longitudinal reduction ratio to obtain a longitudinal sampled pixel value; and
   generating the first adjusted picture frame based on the horizontal sampled pixel value and the longitudinal sampled pixel value.

4. The method according to claim 2, wherein the coding the first adjusted picture frame comprises:

coding the first adjusted picture frame to obtain an initial picture frame code stream of the first adjusted picture frame; and adding the horizontal reduction ratio and the longitudinal reduction ratio to supplemental enhancement information (SEI) of the first adjusted picture frame to obtain the picture frame code stream.

5. The method according to claim 1, wherein the coding the first adjusted picture frame to obtain a picture frame code stream of the first adjusted picture frame comprises:

obtaining a blank picture frame with a resolution the same as the first picture frame;

copying the first adjusted picture frame into the blank picture frame to obtain a first copied picture frame; and coding the first copied picture frame to obtain the picture frame code stream.

6. The method according to claim 5, wherein the coding the first copied picture frame to obtain the picture frame code stream comprises:

obtaining a picture frame preceding the first picture frame as a reference picture frame of the first picture frame;

performing downsampling on the reference picture frame of the first picture frame to obtain a second adjusted picture frame;

copying the second adjusted picture frame into the blank picture frame to obtain a second copied picture frame; and coding the first copied picture frame according to the second copied picture frame to obtain the picture frame code stream.

7. The method according to claim 1, wherein the method further comprises:

performing super-resolution adjustment on the first adjusted picture frame to obtain the second picture frame; and storing the second picture frame as a reference picture frame of a subsequent picture frame after the first picture frame.

8. A computer device, comprising a memory and one or more processors, the memory storing computer-readable instructions that, when executed by the one or more processors, cause the computer device to perform a data processing method including:

detecting a data volume of a first picture frame after being coded;

in response to the data volume of the first picture frame being greater than or equal to a data volume threshold, performing downsampling on the first picture frame to obtain a first adjusted picture frame, wherein the first picture frame corresponds to a scene switching of a computer gaming application and the data volume threshold is based on an average frame data volume of the computer gaming application;

coding the first adjusted picture frame to obtain a picture frame code stream of the first adjusted picture frame; and transmitting the picture frame code stream to an application client at a terminal, wherein the application client decodes the picture frame code stream to obtain a first adjusted picture frame, upsamples the first adjusted picture frame to obtain a second picture frame having a same resolution as the first picture frame, and displays the second picture frame at the terminal.

9. The computer device according to claim 8, wherein the performing downsampling on the first picture frame to obtain a first adjusted picture frame comprises:

obtaining a horizontal reduction ratio and a longitudinal reduction ratio for the first picture frame; and performing downsampling on the first picture frame according to the horizontal reduction ratio and the longitudinal reduction ratio to obtain the first adjusted picture frame.

10. The computer device according to claim 9, wherein the performing downsampling on the first picture frame according to the horizontal reduction ratio and the longitudinal reduction ratio to obtain the first adjusted picture frame comprises:

sampling a horizontal pixel value in the first picture frame based on the horizontal reduction ratio to obtain a horizontal sampled pixel value;

sampling a longitudinal pixel value in the first picture frame based on the longitudinal reduction ratio to obtain a longitudinal sampled pixel value; and generating the first adjusted picture frame based on the horizontal sampled pixel value and the longitudinal sampled pixel value.

11. The computer device according to claim 9, wherein the coding the first adjusted picture frame to obtain a picture frame code stream of the first adjusted picture frame comprises:

coding the first adjusted picture frame to obtain an initial picture frame code stream of the first adjusted picture frame; and adding the horizontal reduction ratio and the longitudinal reduction ratio to supplemental enhancement information (SEI) of the first adjusted picture frame to obtain the picture frame code stream.

12. The computer device according to claim 8, wherein the coding the first adjusted picture frame to obtain a picture frame code stream of the first adjusted picture frame comprises:

obtaining a blank picture frame with a resolution the same as the first picture frame;

copying the first adjusted picture frame into the blank picture frame to obtain a first copied picture frame; and coding the first copied picture frame to obtain the picture frame code stream.

13. The computer device according to claim 12, wherein the coding the first copied picture frame to obtain the picture frame code stream comprises:

obtaining a picture frame preceding the first picture frame as a reference picture frame of the first picture frame;

performing downsampling on the reference picture frame of the first picture frame to obtain a second adjusted picture frame;

copying the second adjusted picture frame into the blank picture frame to obtain a second copied picture frame; and coding the first copied picture frame according to the second copied picture frame to obtain the picture frame code stream.

14. The computer device according to claim 8, wherein the method further comprises:

performing super-resolution adjustment on the first adjusted picture frame to obtain the second picture frame; and storing the second picture frame as a reference picture frame of a subsequent picture frame after the first picture frame.

15. A non-transitory computer-readable storage medium storing computer-readable instructions that, when by one or more processors of a computer device, cause the computer device to perform a data processing method including:

detecting a data volume of a first picture frame after being coded;

in response to the data volume of the first picture frame being greater than or equal to a data volume threshold, performing downsampling on the first picture frame to obtain a first adjusted picture frame, wherein the first picture frame corresponds to a scene switching of a computer gaming application and the data volume threshold is based on an average frame data volume of the computer gaming application;

coding the first adjusted picture frame to obtain a picture frame code stream of the first adjusted picture frame; and transmitting the picture frame code stream to an application client at a terminal, wherein the application client decodes the picture frame code stream to obtain a first adjusted picture frame, upsamples the first adjusted picture frame to obtain a second picture frame having a same resolution as the first picture frame, and displays the second picture frame at the terminal.

16. The non-transitory computer-readable storage medium according to claim 15, wherein the performing downsampling on the first picture frame to obtain a first adjusted picture frame comprises:
- obtaining a horizontal reduction ratio and a longitudinal reduction ratio for the first picture frame; and
- performing downsampling on the first picture frame according to the horizontal reduction ratio and the longitudinal reduction ratio to obtain the first adjusted picture frame.

17. The non-transitory computer-readable storage medium according to claim 15, wherein the method further comprises:
- performing super-resolution adjustment on the first adjusted picture frame to obtain the second picture frame; and
- storing the second picture frame as a reference picture frame of a subsequent picture frame after the first picture frame.

\* \* \* \* \*